US011858670B2

(12) United States Patent
Itagaki et al.

(10) Patent No.: US 11,858,670 B2
(45) Date of Patent: Jan. 2, 2024

(54) BINDING MACHINE

(71) Applicant: MAX CO., LTD., Tokyo (JP)

(72) Inventors: Osamu Itagaki, Tokyo (JP); Shinpei Sugihara, Tokyo (JP); Kouichirou Morimura, Tokyo (JP); Yusuke Yoshida, Tokyo (JP); Ichiro Kusakari, Tokyo (JP)

(73) Assignee: MAX CO., LTD., Tokyo (JP)

( * ) Notice: Subject to any disclaimer, the term of this patent is extended or adjusted under 35 U.S.C. 154(b) by 24 days.

(21) Appl. No.: 17/172,471

(22) Filed: Feb. 10, 2021

(65) Prior Publication Data

US 2021/0245904 A1 Aug. 12, 2021

(30) Foreign Application Priority Data

Feb. 10, 2020 (JP) ................................ 2020-021025
Dec. 29, 2020 (JP) ................................ 2020-219758

(51) Int. Cl.
*B65B 13/02* (2006.01)
*B65B 13/28* (2006.01)
(Continued)

(52) U.S. Cl.
CPC ............ *B65B 13/025* (2013.01); *B25B 25/00* (2013.01); *B65B 13/22* (2013.01); *B65B 13/285* (2013.01); *E04G 21/123* (2013.01)

(58) Field of Classification Search
CPC .......... B21F 15/00; B21F 15/02; B21F 15/04; B65B 13/22; B65B 13/28; B65B 13/285; B65B 13/025; B25B 25/00; E04G 21/123
See application file for complete search history.

(56) References Cited

U.S. PATENT DOCUMENTS 5,682,927 A 11/1997 Takahashi et al.
5,871,036 A * 2/1999 Murayama ............ E04G 21/123 140/57
(Continued)

FOREIGN PATENT DOCUMENTS

CN 105314142 A 2/2016
CN 107031891 A 8/2017
(Continued)

OTHER PUBLICATIONS

Extended European Search Report for EP Application No. 21156068.5 dated Jul. 12, 2021.
(Continued)

*Primary Examiner* — Bobby Yeonjin Kim
(74) *Attorney, Agent, or Firm* — WEIHROUCH IP

(57) ABSTRACT

A binding machine includes: a wire feeding unit configured to feed a wire; a curl forming unit configured to form a path along which the wire fed by the wire feeding unit is to be wound around a to-be-bound object; a butting part against which the to-be-bound object is to be butted; a cutting unit configured to cut the wire wound on the to-be-bound object; a binding unit configured to twist the wire wound on the to-be-bound object and cut by the cutting unit; and a tension applying part configured to apply tension to the wire to be cut at the cutting unit with a force higher than a force applied in a loosening direction of the wire wound on the to-be-bound object.

9 Claims, 28 Drawing Sheets

(51) Int. Cl.

| | |
|---|---|
| ***E04G 21/12*** | (2006.01) |
| ***B25B 25/00*** | (2006.01) |
| ***B65B 13/22*** | (2006.01) |

(56) References Cited

U.S. PATENT DOCUMENTS

| | | | | |
|---|---|---|---|---|
| 5,944,064 | A * | 8/1999 | Saito | E04G 21/122 140/57 |
| 5,956,989 | A * | 9/1999 | Kusakari | E04G 21/122 72/119 |
| 2004/0244866 | A1 | 12/2004 | Ishikawa et al. | |
| 2009/0283167 | A1 | 11/2009 | Nakagawa et al. | |
| 2009/0283170 | A1 | 11/2009 | Nagaoka | |
| 2009/0283171 | A1* | 11/2009 | Nagaoka | E04G 21/123 29/33 F |
| 2010/0293902 | A1 | 11/2010 | Jensen | |
| 2014/0091171 | A1 | 4/2014 | Nakagawa et al. | |
| 2015/0266082 | A1 | 9/2015 | Horn | |
| 2016/0031575 | A1 | 2/2016 | Shindou | |
| 2017/0130472 | A1 | 5/2017 | Nakagawa et al. | |
| 2017/0218631 | A1 | 8/2017 | Matsuno | |
| 2017/0335582 | A1 | 11/2017 | Machida et al. | |
| 2018/0148943 | A1 | 5/2018 | Itagaki et al. | |
| 2018/0155940 | A1 | 6/2018 | Nagaoka et al. | |
| 2018/0161848 | A1* | 6/2018 | Itagaki | B65B 13/285 |
| 2018/0187431 | A1 | 7/2018 | Itagaki et al. | |
| 2018/0187434 | A1 | 7/2018 | Itagaki et al. | |
| 2019/0249447 | A1 | 8/2019 | Itagaki et al. | |
| 2019/0292799 | A1 | 9/2019 | Itagaki et al. | |
| 2020/0002963 | A1 | 1/2020 | Kawazoe | |
| 2020/0149279 | A1 | 5/2020 | Matsuno | |
| 2020/0207494 | A1 | 7/2020 | Shindou | |
| 2020/0270881 | A1 | 8/2020 | Machida et al. | |
| 2020/0378140 | A1 | 12/2020 | Itagaki et al. | |
| 2020/0399914 | A1 | 12/2020 | Nagaoka et al. | |
| 2021/0010282 | A1 | 1/2021 | Itagaki et al. | |
| 2021/0114080 | A1 | 4/2021 | Itagaki et al. | |
| 2021/0138527 | A1 | 5/2021 | Itagaki et al. | |
| 2021/0245229 | A1 | 8/2021 | Yoshida et al. | |
| 2021/0245904 | A1 | 8/2021 | Itagaki et al. | |
| 2021/0245906 | A1 | 8/2021 | Morimura et al. | |
| 2023/0039457 | A1 | 2/2023 | Kawazoe | |

FOREIGN PATENT DOCUMENTS

| | | | |
|---|---|---|---|
| CN | 107399447 | A | 11/2017 |
| CN | 108327970 | A | 7/2018 |
| CN | 108454928 | A | 8/2018 |
| CN | 110656779 | A | 1/2020 |
| EP | 0751269 | A1 | 1/1997 |
| EP | 1415917 | A1 | 5/2004 |
| EP | 2123848 | A2 | 11/2009 |
| EP | 3326921 | A1 | 5/2018 |
| EP | 3327220 | A1 | 5/2018 |
| JP | 3013880 | U | 7/1995 |
| JP | 3013880 | B2 | 12/1999 |
| JP | 2003-027746 | A | 1/2003 |
| JP | 2016-030625 | A | 3/2016 |
| RU | 38729 | U1 | 7/2004 |
| SE | 608175 | C2 | 9/1998 |
| SU | 1551594 | A1 | 3/1990 |
| TW | 249787 | B | 6/1995 |
| WO | 2010-136530 | A2 | 12/2010 |

OTHER PUBLICATIONS

Russian Search Report dated Mar. 27, 2023, issued by the Russian Patent Office in the corresponding Russian Patent Application No. 2021103128, with English Translation. (13 pages).

Chinese Office Action dated May 30, 2023, issued by the Chinese Patent Office in the corresponding Chinese Patent Application No. 202110183576.6. (9 pages).

* cited by examiner

BINDING MACHINE

CROSS-REFERENCE TO RELATED APPLICATIONS

This application is based upon and claims the benefit of priority from prior Japanese patent application No. 2020-021025, filed on Feb. 10, 2020, and Japanese patent application No. 2020-219758, filed on Dec. 29, 2020, the entire contents of which are incorporated herein by reference.

TECHNICAL FIELD

The present invention relates to a binding machine configured to bind a to-be-bound object such as a reinforcing bar with a wire.

BACKGROUND ART

For concrete buildings, reinforcing bars are used so as to improve strength. The reinforcing bars are bound with wires so that the reinforcing bars do not deviate from predetermined positions during concrete placement.

In the related art, suggested is a binding machine referred to as a reinforcing bar binding machine configured to wind two or more reinforcing bars with a wire, and to twist the wire wound on the reinforcing bar, thereby binding the two or more reinforcing bars with the wire.

When binding the reinforcing bars with the wire, if the binding is loosened, the reinforcing bars deviate each other, so that it is required to firmly maintain the reinforcing bars. Therefore, suggested is technology where a twisting unit for twisting a wire wound on reinforcing bars is provided so as to be approachable or separatable with respect to the reinforcing bars, the twisting unit is urged backward away from the reinforcing bars by a coil spring, and the wire is twisted with tension, thereby improving a binding force (for example, refer to PTL 1).

[PTL 1] Japanese Patent No. 3,013,880

However, in a binding machine configured to feed and twist one or more wires, according to a configuration where an extra part of the wire is pulled back to wind the wire on the reinforcing bars and the wire wound on the reinforcing bars is twisted, if the wire wound on the reinforcing bars is loosened before twisting the wire, the wire cannot be closely contacted to the reinforcing bars.

The present invention has been made in view of the above situations, and an object thereof is to provide a binding machine capable of suppressing a wire wound on reinforcing bars, which are a to-be-bound object, from being loosened before twisting the wire.

SUMMARY OF INVENTION

According to an aspect of the present invention, there is provided a binding machine comprising: a wire feeding unit configured to feed a wire; a curl forming unit configured to form a path along which the wire fed by the wire feeding unit is to be wound around a to-be-bound object; a butting part against which the to-be-bound object is to be butted; a cutting unit configured to cut the wire wound on the to-be-bound object; a binding unit configured to twist the wire wound on the to-be-bound object and cut by the cutting unit; and a tension applying part configured to apply tension to the wire to be cut at the cutting unit with a force higher than a force applied in a loosening direction of the wire wound on the to-be-bound object.

According to an aspect of the present invention, there is also provided a binding machine comprising: a wire feeding unit configured to feed a wire; a curl forming unit configured to form a path along which the wire fed by the wire feeding unit is to be wound around a to-be-bound object; a butting part against which the to-be-bound object is to be butted; a cutting unit configured to cut the wire wound on the to-be-bound object; and a binding unit configured to twist the wire wound on the to-be-bound object, wherein the binding unit comprises: a rotary shaft; a wire engaging body configured to move in an axis direction of the rotary shaft and to engage the wire in a first operation area in the axis direction of the rotary shaft, and configured to move in the axis direction of the rotary shaft and to twist the wire with rotating together with the rotary shaft in a second operation area in the axis direction of the rotary shaft; a rotation regulation part configured to regulate rotation of the wire engaging body; and a tension applying part configured to perform, in the second operation area, an operation of applying tension on the wire engaged by the wire engaging body in the first operation area, and wherein the tension applied to the wire is equal to or larger than 10% and equal to or smaller than 50% with respect to a maximum tensile load of the wire.

According to an aspect of the present invention, the tension applying part applies tension to the wire to be cut at the cutting unit with the force higher than the force applied in the loosening direction of the wire before the wire is twisted by the binding unit.

According to an aspect of the present invention, the wire wound on the to-be-bound object is suppressed from being loosened before being twisted. Thereby, the wire can be closely contacted to the to-be-bound object by the operation of twisting the wire. In addition, when twisting the wire wound on the to-be-bound object by applying the tension to the wire, the tension applied to the wire is equal to or larger than 10% and equal to or smaller than 50% with respect to the maximum tensile load of the wire. Thereby, the loosening due to an extra part of the wire can be removed, the wire can be closely contacted to the to-be-bound object, and the wire can be prevented from being carelessly cut. In addition, it is possible to suppress the unnecessarily high outputs of the motor that feeds the wire and the motor that actuates the binding unit.

DESCRIPTION OF EMBODIMENTS

Hereinbelow, an example of a reinforcing bar binding machine that is an embodiment of the binding machine of the present invention will be described with reference to the drawings.

<Configuration Example of Reinforcing Bar Binding Machine of First Embodiment>

Figure 1:
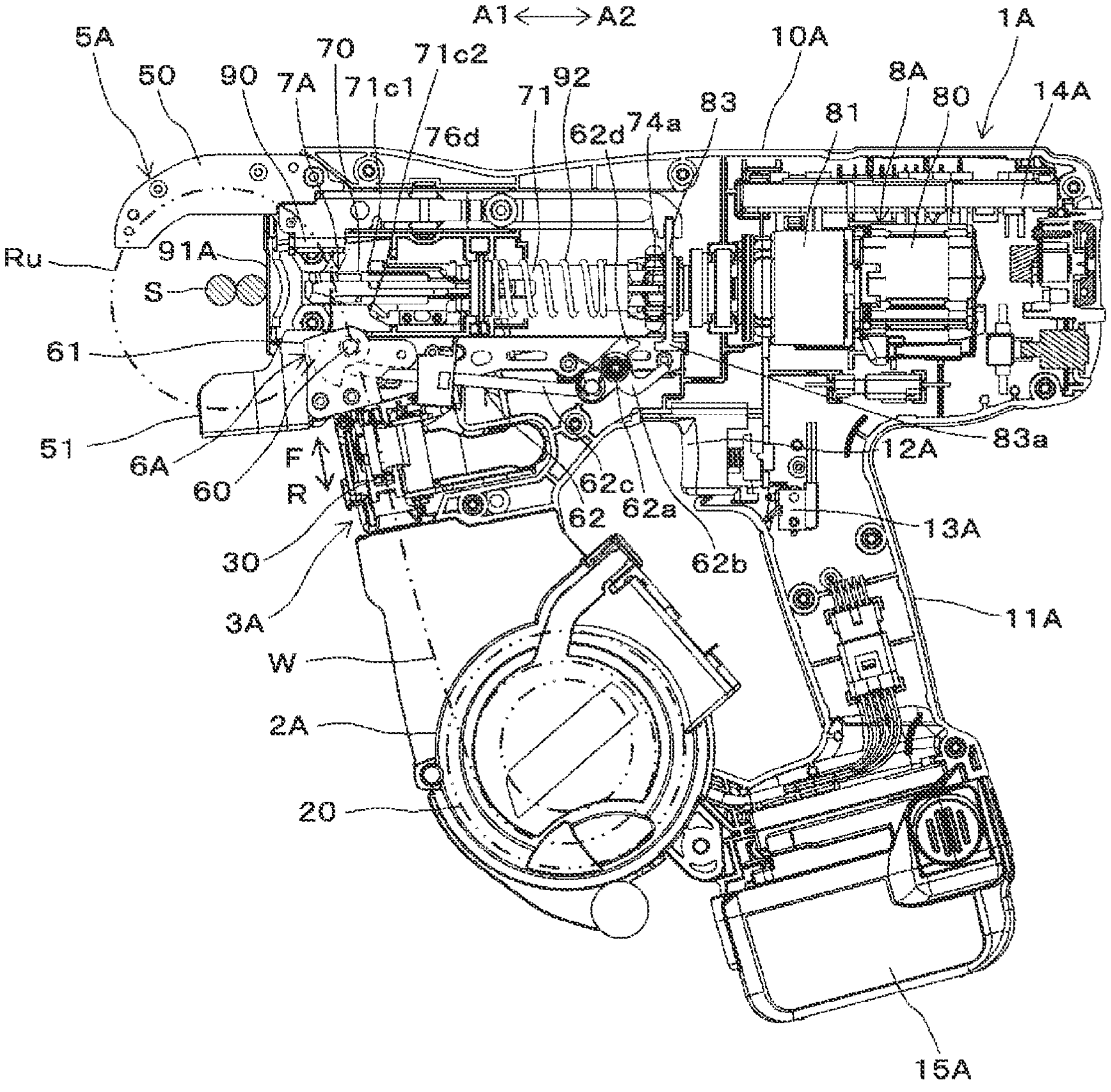
FIG. 1 is a view depicting an example of an entire internal configuration of a reinforcing bar binding machine of a first embodiment, as seen from a side.

FIG. 1 is a view depicting an example of an entire internal configuration of a reinforcing bar binding machine of a first embodiment, as seen from a side. A reinforcing bar binding machine 1A has such a shape that an operator grips with a hand, and includes a main body part 10A and a handle part 11A.

The reinforcing bar binding machine 1A is configured to feed a wire W in a forward direction denoted with an arrow F, to wind the wire around reinforcing bars S, which are a to-be-bound object, to feed the wire W wound around the reinforcing bars S in a reverse direction denoted with an arrow R, to wind the wire on the reinforcing bars S, and to twist the wire W, thereby binding the reinforcing bars S with the wire W.

In order to implement the above functions, the reinforcing bar binding machine 1A includes a magazine 2A in which the wire W is accommodated, and a wire feeding unit 3A configured to feed the wire W. The reinforcing bar binding machine 1A also includes a curl forming unit 5A configured to form a path along which the wire W fed by the wire feeding unit 3A is to be wound around the reinforcing bars S, and a cutting unit 6A configured to cut the wire W wound on the reinforcing bars S. The reinforcing bar binding machine 1A also includes a binding unit 7A configured to twist the wire W wound on the reinforcing bars S, and a drive unit 8A configured to drive the binding unit 7A.

The magazine 2A is an example of an accommodation unit in which a reel 20 on which the long wire W is wound to be reeled out is rotatably and detachably accommodated. For the wire W, a wire made of a plastically deformable metal wire, a wire having a metal wire covered with a resin, a twisted wire and the like are used. The reel 20 is configured so that one or more wires W are wound on a hub part (not shown) and can be reeled out from the reel 20 at the same time.

The wire feeding unit 3A includes a pair of feeding gears 30 configured to sandwich and feed one or more wires W aligned in parallel. In the wire feeding unit 3A, a rotating operation of a feeding motor (not shown) is transmitted to rotate the feeding gears 30. Thereby, the wire feeding unit 3A feeds the wire W sandwiched between the pair of feeding gears 30 along an extension direction of the wire W. In a configuration where a plurality of, for example, two wires W are fed, the two wires W are fed aligned in parallel.

The wire feeding unit 3A is configured so that the rotation directions of the feeding gears 30 are switched and the feeding direction of the wire W is switched between forward and reverse directions by switching the rotation direction of the feeding motor (not shown) between forward and reverse directions.

The curl forming unit 5A includes a curl guide 50 configured to curl the wire W that is fed by the wire feeding unit 30, and an induction guide 51 configured to guide the wire W curled by the curl guide 50 toward the binding unit 7A. In the reinforcing bar binding machine 1A, a path of the wire W that is fed by the wire feeding unit 3A is regulated by the curl forming unit 5A, so that a locus of the wire W becomes a loop Ru as shown with a broken line in FIG. 1 and the wire W is thus wound around the reinforcing bars S.

The cutting unit 6A includes a fixed blade part 60, a movable blade part 61 configured to cut the wire W in cooperation with the fixed blade part 60, and a transmission mechanism 62 configured to transmit an operation of the binding unit 7A to the movable blade part 61. The cutting unit 6A is configured to cut the wire W by a rotating operation of the movable blade part 61 about the fixed blade part 60, which is a support point. The transmission mechanism 62 includes a first link 62*b* configured to rotate about a shaft 62*a* as a support point, and a second link 62*b* configured to connect the first link 62*b* and the movable blade part 61, and a rotating operation of the first link 62*b* is transmitted to the movable blade part 61 via the second link 83*b*.

The binding unit 7A includes a wire engaging body 70 to which the wire W is engaged. A detailed embodiment of the binding unit 7A will be described later. The drive unit 8A includes a motor 80, and a decelerator 81 configured to perform deceleration and amplification of torque.

The reinforcing bar binding machine 1A includes a feeding regulation part 90 against which a tip end of the wire W is butted, on a feeding path of the wire W that is engaged by the wire engaging body 70. In the reinforcing bar binding machine 1A, the curl guide 50 and the induction guide 51 of the curl forming unit 5A are provided at an end portion on a front side of the main body part 10A. In the reinforcing bar binding machine 1A, a butting part 91A against which the reinforcing bars S are to be butted is provided at the end portion on the front side of the main body part 10A and between the curl guide 50 and the induction guide 51.

In the reinforcing bar binding machine 1A, the handle part 11A extends downwardly from the main body part 10A. Also, a battery 15A is detachably mounted to a lower part of the handle part 11A. Also, the magazine 2A of the reinforcing bar binding machine 1A is provided in front of the handle part 11A. In the main body part 10A of the reinforcing bar binding machine 1A, the wire feeding unit 3A, the cutting unit 6A, the binding unit 7A, the drive unit 8A configured to drive the binding unit 7A, and the like are accommodated.

A trigger 12A is provided on a front side of the handle part 11A of the reinforcing bar binding machine 1A, and a switch 13A is provided inside the handle part 11A. The reinforcing bar binding machine 1A is configured so that a control unit 14A controls the motor 80 and the feeding motor (not shown) according to a state of the switch 13A pushed as a result of an operation on the trigger 12A.

Figure 2A:
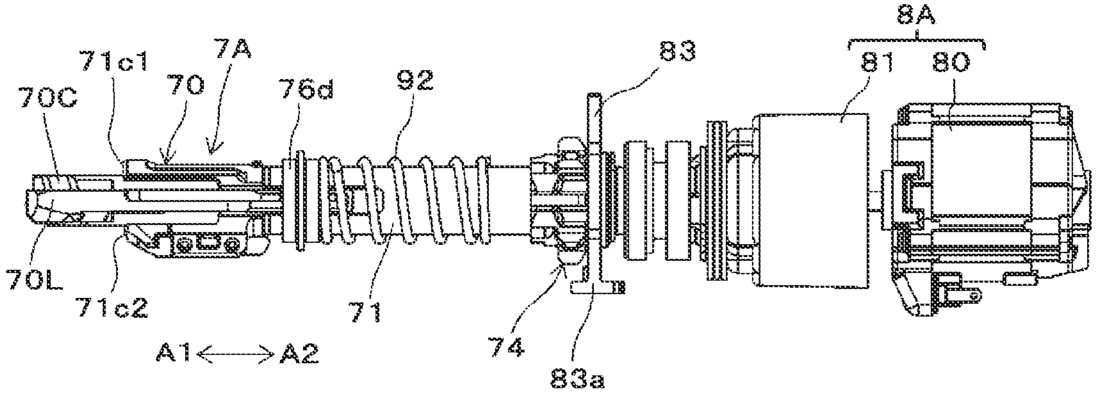
FIG. 2A is a side view depicting a configuration of main parts of the reinforcing bar binding machine of the first embodiment.
Figure 2B:
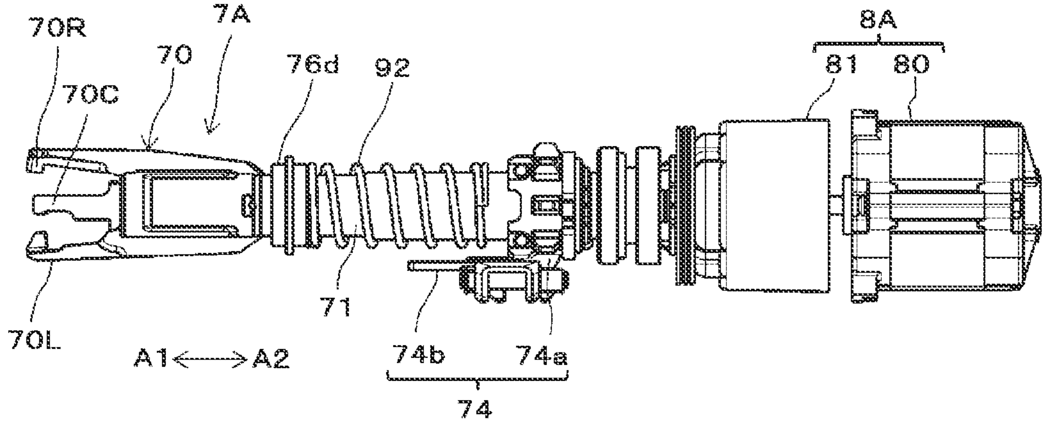
FIG. 2B is a top view depicting a configuration of main parts of the reinforcing bar binding machine of the first embodiment.
Figure 2C:
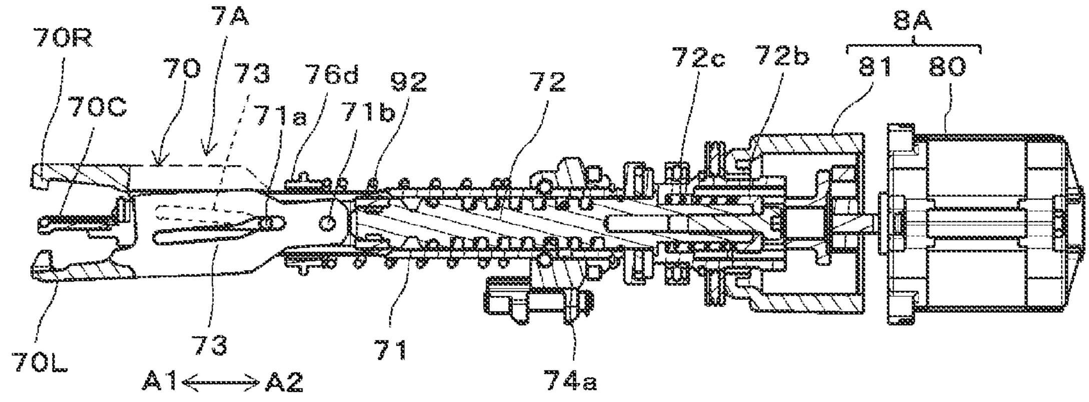
FIG. 2C is a top sectional view depicting a configuration of main parts of the reinforcing bar binding machine of the first embodiment.

FIG. 2A is a side view depicting a configuration of main parts of the reinforcing bar binding machine of the first embodiment, FIG. 2B is a top view depicting a configuration of main parts of the reinforcing bar binding machine of the first embodiment, and FIG. 2C is a top sectional view depicting a configuration of main parts of the reinforcing bar binding machine of the first embodiment. Subsequently, the details of the binding unit 7A, a connection structure of the binding unit 7A and the drive unit 8A, and a tension applying mechanism of the first embodiment for enabling binding in a state where the wire W is applied with tension are described with reference to the respective drawings.

The binding unit 7A includes a wire engaging body 70 to which the wire W is to be engaged, and a rotary shaft 72 for actuating the wire engaging body 70. The binding unit 7A and the drive unit 8A are configured so that the rotary shaft 72 and the motor 80 are connected each other via the decelerator 81 and the rotary shaft 72 is driven via the decelerator 81 by the motor 80.

The wire engaging body 70 has a center hook 70C connected to the rotary shaft 72, a first side hook 70L and a second side hook 70R configured to open and close with respect to the center hook 70C, and a sleeve 71 configured to actuate the first side hook 70L and the second side hook 70R in conjunction with a rotating operation of the rotary shaft 72.

In the binding unit 7A, a side on which the center hook 70C, the first side hook 70L and the second side hook 70R are provided is referred to as a front side, and a side on which the rotary shaft 72 is connected to the decelerator 81 is referred to as a rear side.

The center hook 70C is connected to a front end of the rotary shaft 72, which is an end portion on one side, via a configuration that can rotate with respect to the rotary shaft 72 and move integrally with the rotary shaft 72 in an axis direction.

A tip end-side of the first side hook 70L, which is an end portion on one side in the axis direction of the rotary shaft 72, is positioned at a side part on one side with respect to the center hook 70C. A rear end-side of the first side hook 70L, which is an end portion on the other side in the axis direction of the rotary shaft 72, is rotatably supported to the center hook 70C by a shaft 71*b*.

A tip end-side of the second side hook 70R, which is an end portion on one side in the axis direction of the rotary shaft 72, is positioned at a side part on the other side with respect to the center hook 70C. A rear end-side of the second side hook 70R, which is an end portion on the other side in the axis direction of the rotary shaft 72, is rotatably supported to the center hook 70C by the shaft 71*b*.

Thereby, the wire engaging body 70 opens/closes in directions in which the tip end-side of the first side hook 70L separates and contacts with respect to the center hook 70C by a rotating operation about the shaft 71*b* as a support point. The wire engaging body 70 also opens/closes in directions in which the tip end-side of the second side hook 70R separates and contacts with respect to the center hook 70C.

A rear end of the rotary shaft 72, which is an end portion on the other side, is connected to the decelerator 81 via a connection portion 72*b* having a configuration that can cause the connection portion to rotate integrally with the decelerator 81 and to move in the axis direction with respect to the decelerator 81. The connection portion 72*b* has a spring 72*c* for urging backward the rotary shaft 72 toward the decelerator 81 and regulating an axial position of the rotary shaft 72. Thereby, the rotary shaft 72 is configured to be movable forward away from the decelerator 81 while receiving a force pushed backward by the spring 72*c*. Therefore, when a force of moving forward the wire engaging body 70 in the axis direction is applied, the rotary shaft 72*c* can move forward while receiving a force pushed backward by the spring 72*c*.

The sleeve 71 has such a shape that a range of a predetermined length from an end portion in the forward direction denoted with the arrow A1 in the axis direction of the rotary shaft 72 is bisected diametrically and the first side hook 70L and the second side hook 70R enter. The sleeve 71 has a tubular shape surrounding the rotary shaft 72, and has a convex portion (not shown) protruding from an inner peripheral surface of a space in which the rotary shaft 72 is inserted, and the convex portion enters a groove portion of a feeding screw 72*a* formed along the axis direction on an outer periphery of the rotary shaft 72. When the rotary shaft 72 rotates, the sleeve 71 moves in a front and rear direction along the axis direction of the rotary shaft 72 according to a rotation direction of the rotary shaft 72 by an action of the convex portion (not shown) and the feeding screw 72*a* of the rotary shaft 72. The sleeve 71 is also configured to rotate integrally with the rotary shaft 72.

The sleeve 71 has an opening/closing pin 71*a* configured to open/close the first side hook 70L and the second side hook 70R.

The opening/closing pin 71*a* is inserted into opening/closing guide holes 73 formed in the first side hook 70L and the second side hook 70R. The opening/closing guide hole 73 has a shape of extending in a moving direction of the sleeve 71 and converting linear motion of the opening/closing pin 71*a* configured to move in conjunction with the sleeve 71 into an opening/closing operation by rotation of the first side hook 70L and the second side hook 70R about the shaft 71*b* as a support point.

The wire engaging body 70 is configured so that, when the sleeve 71 is moved backward (refer to an arrow A2), the first side hook 70L and the second side hook 70R move away from the center hook 70C by the rotating operations about the shaft 71*b* as a support point, due to a locus of the opening/closing pin 71*a* and the shape of the opening/closing guide holes 73.

Thereby, the first side hook 70L and the second side hook 70R are opened with respect to the center hook 70C, so that a feeding path through which the wire W is to pass is formed between the first side hook 70L and the center hook 70C and between the second side hook 70R and the center hook 70C.

In a state where the first side hook 70L and the second side hook 70R are opened with respect to the center hook 70C, the wire W that is fed by the wire feeding unit 3A passes between the center hook 70C and the first side hook 70L. The wire W passing between the center hook 70C and the first side hook 70L is guided to the curl forming unit 5A. Then, the wire curled by the curl forming unit 5A and guided to the binding unit 7A passes between the center hook 70C and the second side hook 70R.

The wire engaging body 70 is configured so that, when the sleeve 71 is moved in the forward direction denoted with the arrow A1, the first side hook 70L and the second side hook 70R move toward the center hook 70C by the rotating operations about the shaft 76 as a support point, due to the locus of the opening/closing pin 71*a* and the shape of the opening/closing guide holes 73. Thereby, the first side hook 70L and the second side hook 70R are closed with respect to the center hook 70C.

When the first side hook 70L is closed with respect to the center hook 70C, the wire W sandwiched between the first side hook 70L and the center hook 70C is engaged in such a manner that the wire can move between the first side hook 70L and the center hook 70C. Also, when the second side hook 70R is closed with respect to the center hook 70C, the wire W sandwiched between the second side hook 70R and the center hook 70C is engaged in such a manner that the wire cannot come off between the second side hook 70R and the center hook 70C.

The wire engaging body 70 has a bending portion 71*c*1 configured to push and bend a tip end-side (end portion on one side) of the wire W in a predetermined direction to form the wire W into a predetermined shape, and a bending portion 71*c*2 configured to push and bend a terminal end-side (end portion on the other side) of the wire W cut by the cutting unit 6A in a predetermined direction to form the wire W into a predetermined shape. In the present example, the bending portion 71*c*1 and the bending portion 71*c*2 are formed at an end portion of the sleeve 71 in the forward direction denoted with the arrow A1.

The sleeve 71 is moved in the forward direction denoted with the arrow A1, so that the tip end-side of the wire W engaged by the center hook 70C and the second side hook 70R is pushed and is bent toward the reinforcing bars S by the bending portion 71*c*1. Also, the sleeve 71 is moved in the forward direction denoted with the arrow A1, so that the terminal end-side of the wire W engaged by the center hook 70C and the first side hook 70L and cut by the cutting unit 6A is pushed and is bent toward the reinforcing bars S by the bending portion 71c2.

The binding unit 7A includes a rotation regulation part 74 configured to regulate rotations of the wire engaging body 70 and the sleeve 71 in conjunction with the rotating operation of the rotary shaft 72. The rotation regulation part 74 has rotation regulation blades 74a provided to the sleeve 71 and a rotation regulation claw 74b provided to the main body part 10A.

The rotation regulation blades 74a are configured by a plurality of convex portions protruding diametrically from an outer periphery of the sleeve 71 and provided with predetermined intervals in a circumferential direction of the sleeve 71. The rotation regulation blades 74a are fixed to the sleeve 71 and are moved and rotated integrally with the sleeve 71.

The rotation regulation claw 74b has a first claw portion 74b1 and a second claw portion 74b2, as a pair of claw portions facing each other with an interval through which the rotation regulation blade 74a can pass. The first claw portion 74b1 and the second claw portion 74b2 are configured to be retractable from the locus of the rotation regulation blade 74a by being pushed by the rotation regulation blade 74a according to the rotation direction of the rotation regulation blade 74a.

In an operation area where the wire W is engaged by the wire engaging body 70, the wire W is wound on the reinforcing bars S and is then cut and the wire W is bent by the bending portions 71c1 and 71c2 of the sleeve 71, the rotation regulation blade 74a of the rotation regulation part 74 is engaged to the rotation regulation claw 74b. When the rotation regulation blade 74a is engaged to the rotation regulation claw 74b, the rotation of the sleeve 71 in conjunction with the rotation of the rotary shaft 72 is regulated, so that the sleeve 71 is moved in the front and rear direction by the rotating operation of the rotary shaft 72.

In an operation area where the wire W engaged by the wire engaging body 70 is twisted, the engaged state of the rotation regulation blade 74a of the rotation regulation part 74 with the rotation regulation claw 74b is released. When the engaged state of the rotation regulation blade 74a with the rotation regulation claw 74b is released, the sleeve 71 rotates in conjunction with the rotation of the rotary shaft 72. The center hook 70C, the first side hook 70L and the second side hook 70R of the wire engaging body 70 engaging the wire W rotate in conjunction with the rotation of the sleeve 71. In the operation area of the sleeve 71 and the wire engaging body 70 along the axis direction of the rotary shaft 72, the operation area where the wire W is engaged by the wire engaging body 70 is referred to as a first operation area. The operation area, in which the wire W engaged by the wire engaging body 70 is twisted, of the first operation area is referred to as a second operation area.

In the binding unit 7A, a movable member 83 is provided so as to be movable in conjunction with the sleeve 71. The movable member 83 is rotatably attached to the sleeve 71, does not operate in conjunction with the rotation of the sleeve 71, and is configured to move in the front and rear direction in conjunction with the sleeve 71.

The movable member 83 has an engaging portion 83a that is engaged with an engaged portion 62d provided to the first link 62b of the transmission mechanism 62. In the binding unit 7A, when the movable member 83 moves in the front and rear direction in conjunction with the sleeve 71, the engaging portion 83a is engaged with the engaged portion 62d, thereby rotating the first link 62b. The transmission mechanism 62 transmits the rotating operation of the first link 62b to the movable blade part 61 via the second link 83b, thereby rotating the movable blade part 61. Thereby, the forward moving operation of the sleeve 71 rotates the movable blade part 61 in a predetermined direction, so that the wire W is cut.

The binding unit 7A includes a tension applying spring 92 for enabling binding in a state where the wire W is applied with tension. The tension applying spring 92 is an example of the tension applying part that is the tension applying mechanism of the first embodiment, is provided on an outer side of the sleeve 71, and urges the sleeve 71 and the wire engaging body 70 away from the butting part 91A in the axis direction of the rotary shaft 72. The tension applying spring 92 is, for example, a coil spring that expands and contracts in the axis direction, and is fitted on the outer periphery of the sleeve 71 between the rotation regulation blade 74a and a support frame 76d configured to support the sleeve 71 so as to be rotatable and slidable in the axis direction. In a case where the tension applying spring 92 is configured by a coil spring, the spring is configured to have an inner diameter larger than an outer diameter of the sleeve 71. Note that, the tension applying spring 92 is not limited to the coil spring that expands and contracts in the axis direction, and may also be a plate spring, a tortional coil spring, one or more dish springs or the like configured to urge the sleeve 71 in the axis direction of the rotary shaft 72.

The tension applying spring 92 is compressed between the support frame 76d and the rotation regulation blade 74a according to a position of the sleeve 71 in the axis direction of the rotary shaft 72, thereby urging the sleeve 71 backward away from the butting part 91A along the axis direction of the rotary shaft 72. Thereby, the tension applying spring 92 urges the wire engaging body 70 having the sleeve 71 in a direction of maintaining the tension applied to the wire W by the operations of feeding the wire W in the reverse direction and winding the wire on the reinforcing bars S. The rotary shaft 72 is also connected to the decelerator 81 via the connection portion 72b having a configuration of enabling the rotary shaft 72 to move in the axis direction.

Thereby, when the sleeve 71 is moved forward and compressed, the tension applying spring 92 applies tension to the wire W, which is to be cut at the cutting unit 6A after being wound on the reinforcing bars S, with a force higher than a force applied in a loosening direction of the wire W wound on the reinforcing bars S.

That is, a reaction force of tension that is applied to the wire W by the operation of winding the wire W on the reinforcing bars S applies a force by which the wire engaging body 70 is moved in the forward direction along the axis direction in which the wire W wound on the reinforcing bars S is loosened.

In an area where a force of extending the compressed tension applying spring 92 is higher than the force of moving the wire engaging body 70 with the reaction force of tension applied to the wire W wound on the reinforcing bars S, the tension applying spring 92 suppresses the wire engaging body 70 from moving forward. Thereby, it is possible to perform binding in a state where the wire W after cut is applied with tension.

The wire engaging body 70 is also configured to be movable forward while the sleeve 71 receives a force pushed backward by the tension applying spring 92 and the rotary shaft 72 receives a force pushed backward by the spring 72c.

<Example of Operation of Reinforcing Bar Binding Machine of First Embodiment>

Figure 3A:
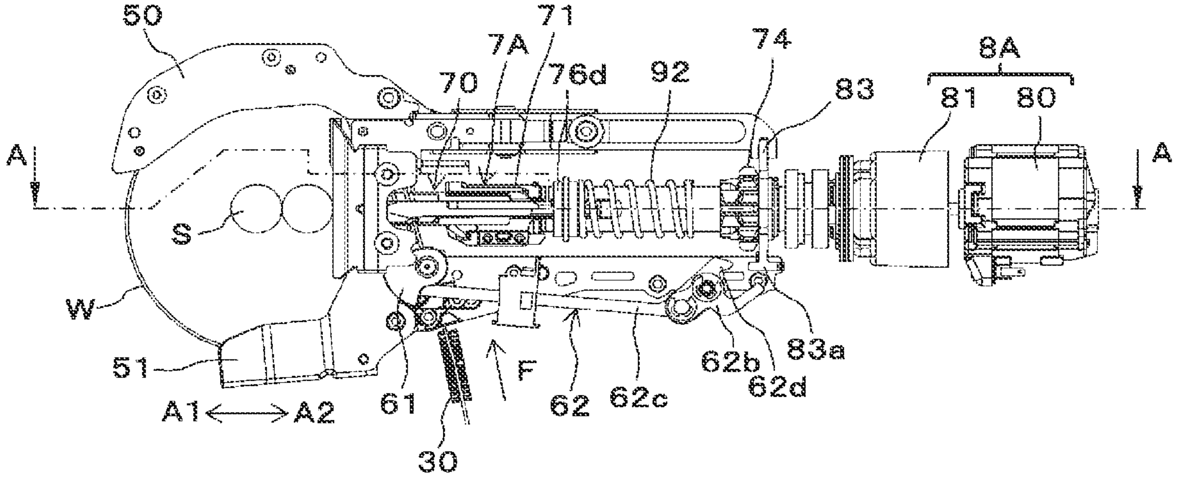
FIG. 3A is a side view of main parts of the reinforcing bar binding machine of the first embodiment.
Figure 3B:
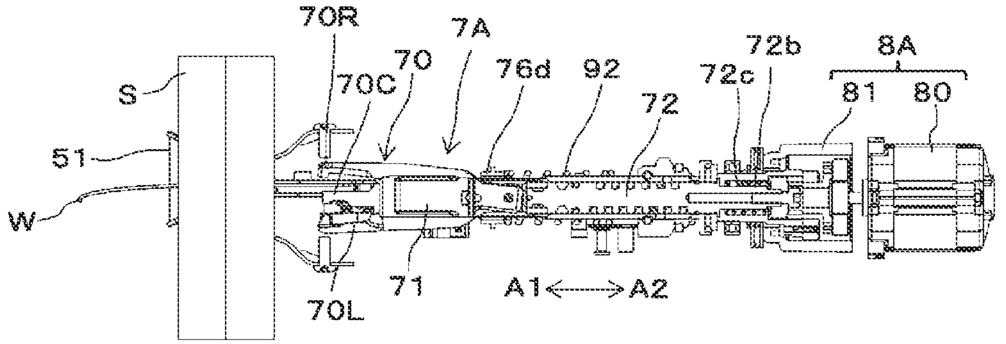
FIG. 3B is a top sectional view of main parts of the reinforcing bar binding machine of the first embodiment.
Figure 3C:
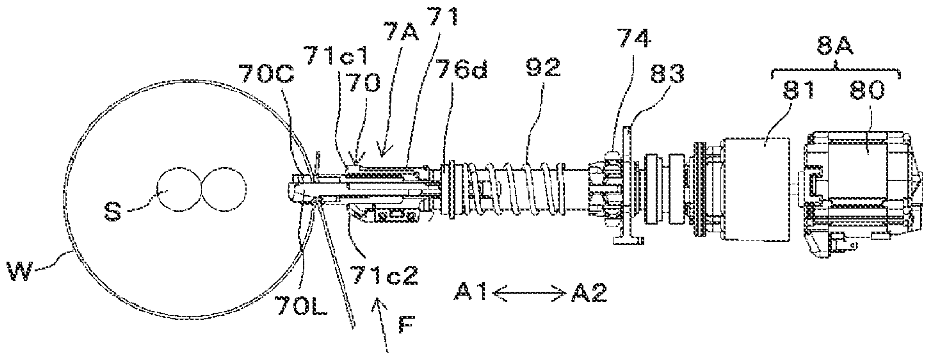
FIG. 3C is a side view of main parts of a binding unit and a drive unit of the reinforcing bar binding machine of the first embodiment.

FIG. 3A is a side view of main parts of the reinforcing bar binding machine of the first embodiment, FIG. 3B is a top sectional view of main parts of the reinforcing bar binding machine of the first embodiment, taken along a line A-A of FIG. 3A, and FIG. 3C is a side view of main parts of the binding unit and the drive unit of the reinforcing bar binding machine of the first embodiment, depicting operations during feeding of the wire.

Figure 4A:
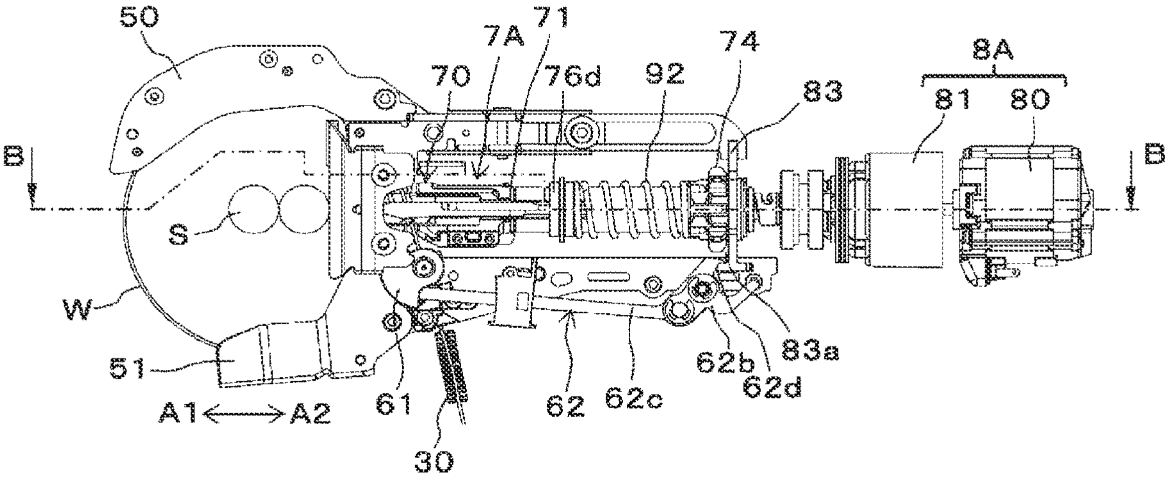
FIG. 4A is a side view of main parts of the reinforcing bar binding machine of the first embodiment.
Figure 4B:
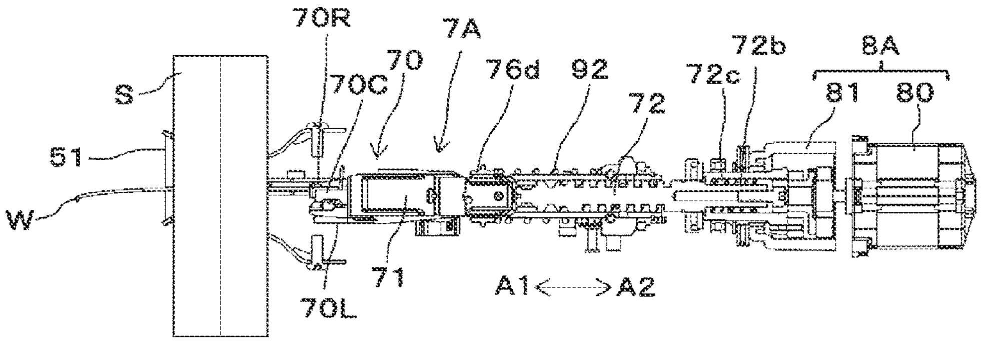
FIG. 4B is a top sectional view of main parts of the reinforcing bar binding machine of the first embodiment.
Figure 4C:
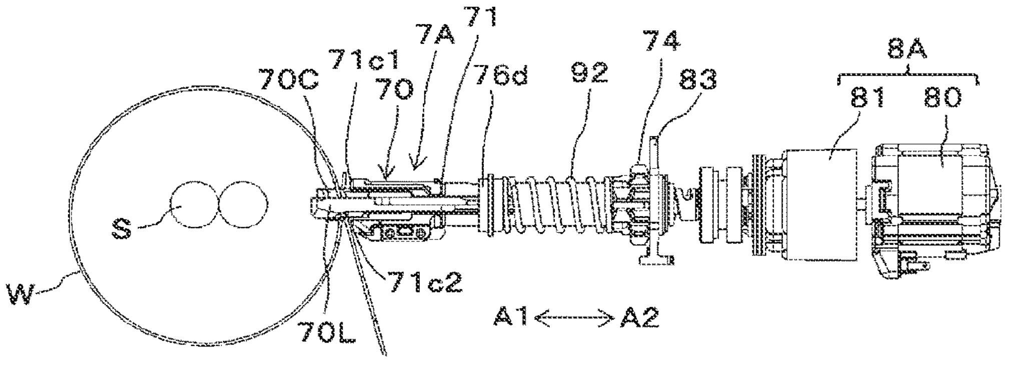
FIG. 4C is a side view of main parts of the binding unit and the drive unit of the reinforcing bar binding machine of the first embodiment.

FIG. 4A is a side view of main parts of the reinforcing bar binding machine of the first embodiment, FIG. 4B is a top sectional view of main parts of the reinforcing bar binding machine of the first embodiment, taken along a line B-B of FIG. 4A, and FIG. 4C is a side view of main parts of the binding unit and the drive unit of the reinforcing bar binding machine of the first embodiment, depicting operations during engaging of the wire.

Figure 5A:
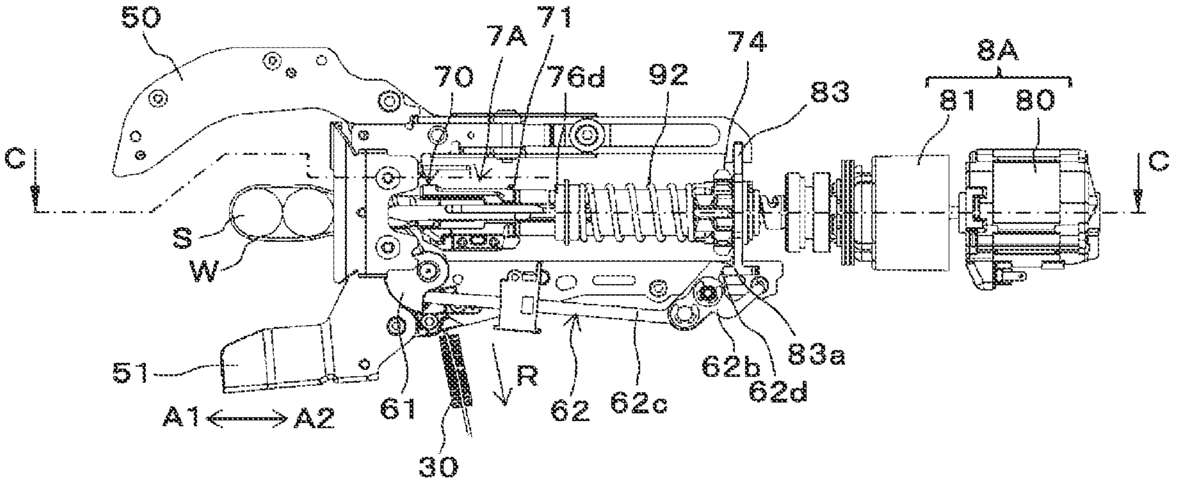
FIG. 5A is a side view of main parts of the reinforcing bar binding machine of the first embodiment.
Figure 5B:
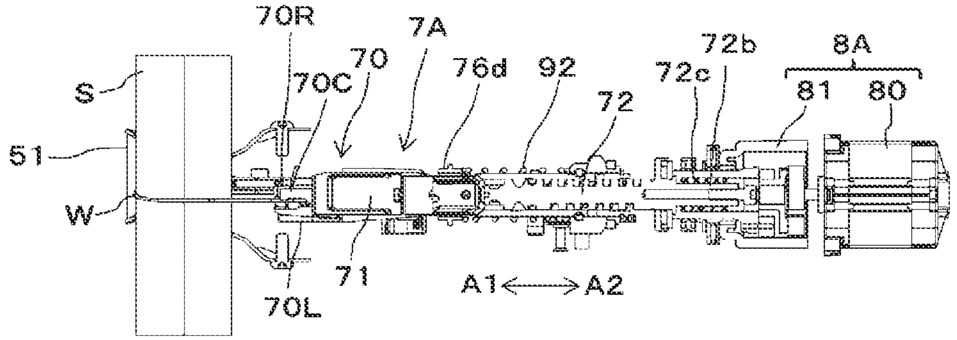
FIG. 5B is a top sectional view of main parts of the reinforcing bar binding machine of the first embodiment.
Figure 5C:
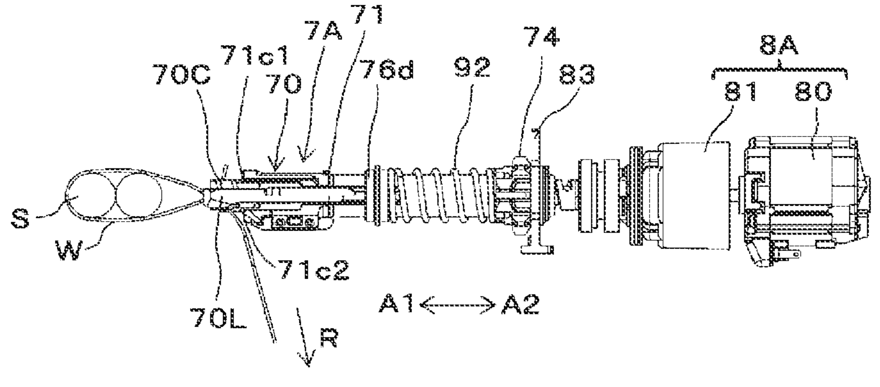
FIG. 5C is a side view of main parts of the binding unit and the drive unit of the reinforcing bar binding machine of the first embodiment.

FIG. 5A is a side view of main parts of the reinforcing bar binding machine of the first embodiment, FIG. 5B is a top sectional view of main parts of the reinforcing bar binding machine of the first embodiment, taken along a line C-C of FIG. 5A, and FIG. 5C is a side view of main parts of the binding unit and the drive unit of the reinforcing bar binding machine of the first embodiment, depicting operations during reverse feeding of the wire.

Figure 6A:
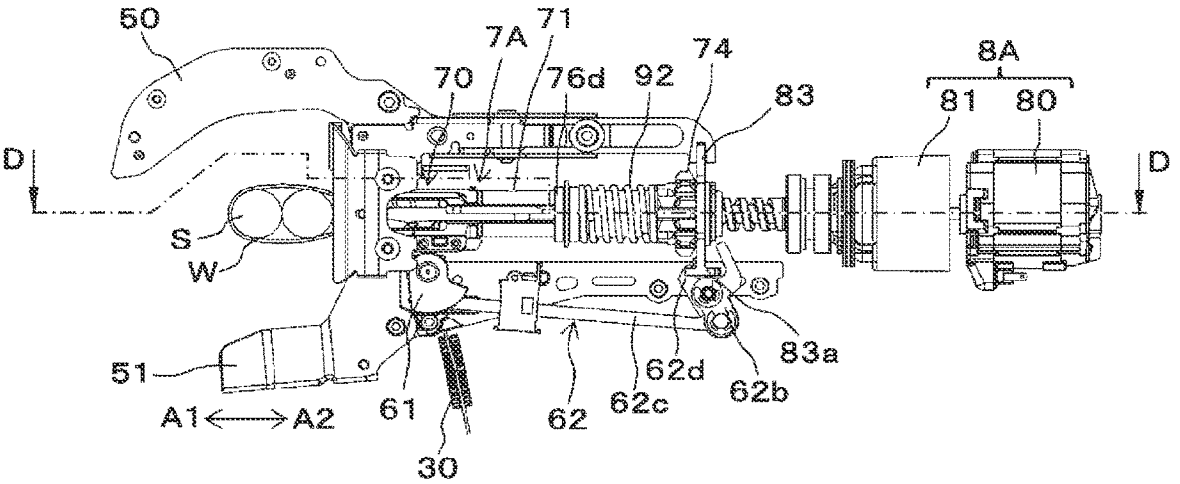
FIG. 6A is a side view of main parts of the reinforcing bar binding machine of the first embodiment.
Figure 6B:
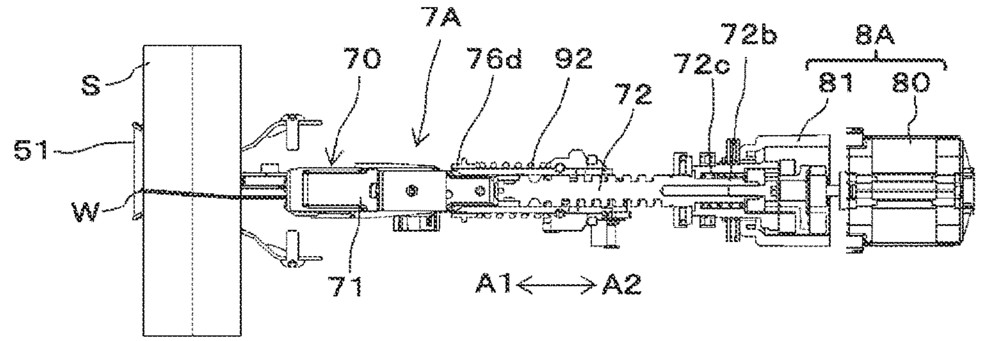
FIG. 6B is a top sectional view of main parts of the reinforcing bar binding machine of the first embodiment.
Figure 6C:
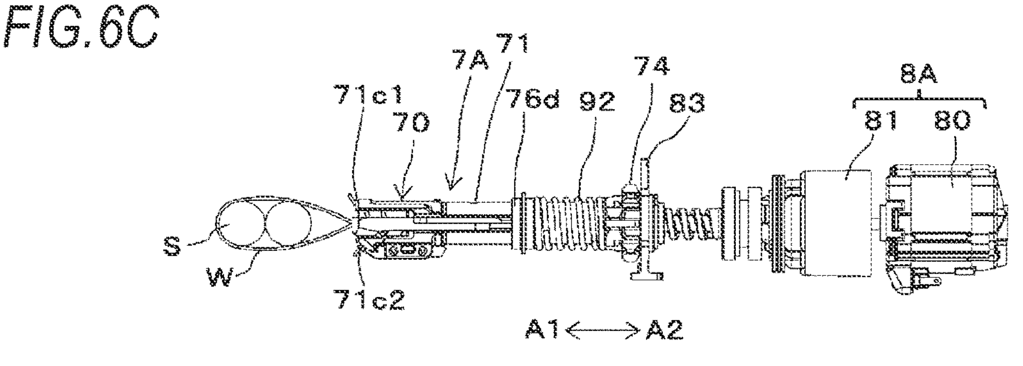
FIG. 6C is a side view of main parts of the binding unit and the drive unit of the reinforcing bar binding machine of the first embodiment.

FIG. 6A is a side view of main parts of the reinforcing bar binding machine of the first embodiment, FIG. 6B is a top sectional view of main parts of the reinforcing bar binding machine of the first embodiment, taken along a line D-D of FIG. 6A, and FIG. 6C is a side view of main parts of the binding unit and the drive unit of the reinforcing bar binding machine of the first embodiment, depicting operations during cutting and bending of the wire.

Figure 7A:
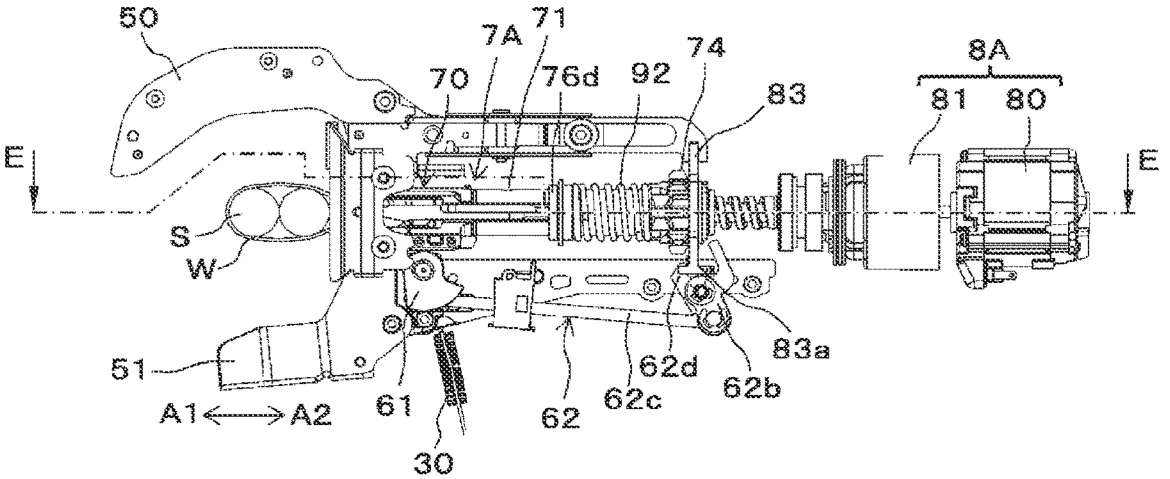
FIG. 7A is a side view of main parts of the reinforcing bar binding machine of the first embodiment.
Figure 7B:
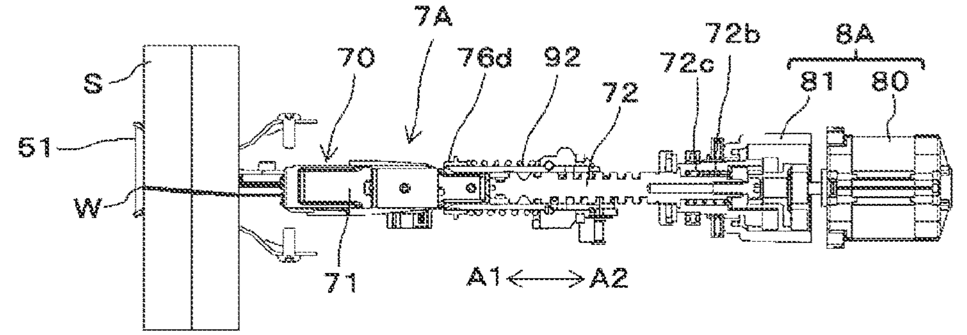
FIG. 7B is a top sectional view of main parts of the reinforcing bar binding machine of the first embodiment.
Figure 7C:
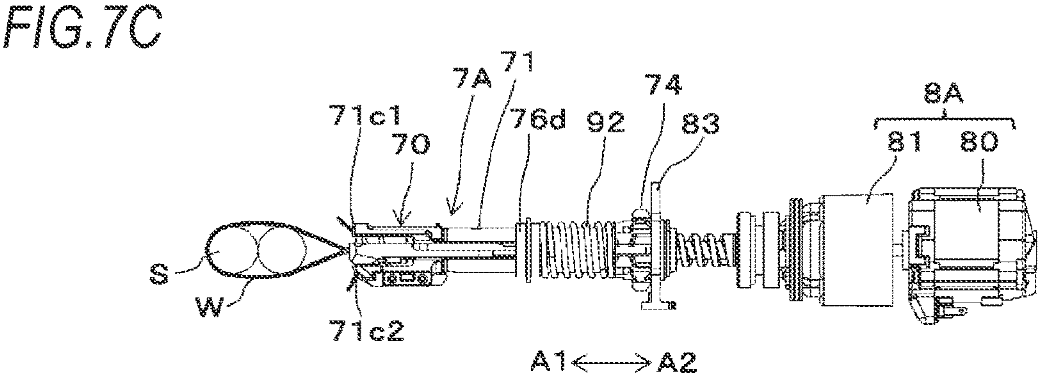
FIG. 7C is a side view of main parts of the binding unit and the drive unit of the reinforcing bar binding machine of the first embodiment.

FIG. 7A is a side view of main parts of the reinforcing bar binding machine of the first embodiment, FIG. 7B is a top sectional view of main parts of the reinforcing bar binding machine of the first embodiment, taken along a line E-E of FIG. 7A, and FIG. 7C is a side view of main parts of the binding unit and the drive unit of the reinforcing bar binding machine of the first embodiment, depicting operations during twisting of the wire.

Figure 8A:
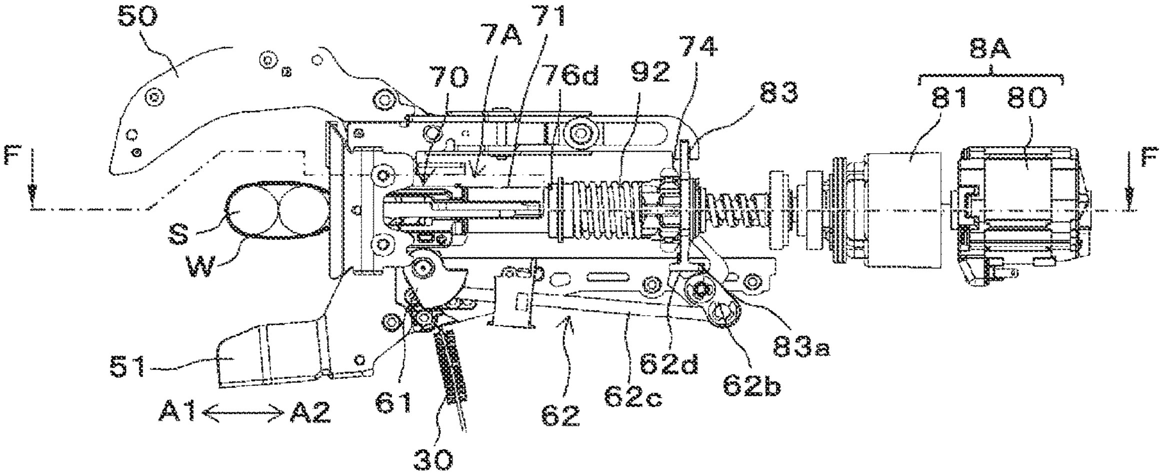
FIG. 8A is a side view of main parts of the reinforcing bar binding machine of the first embodiment.
Figure 8B:
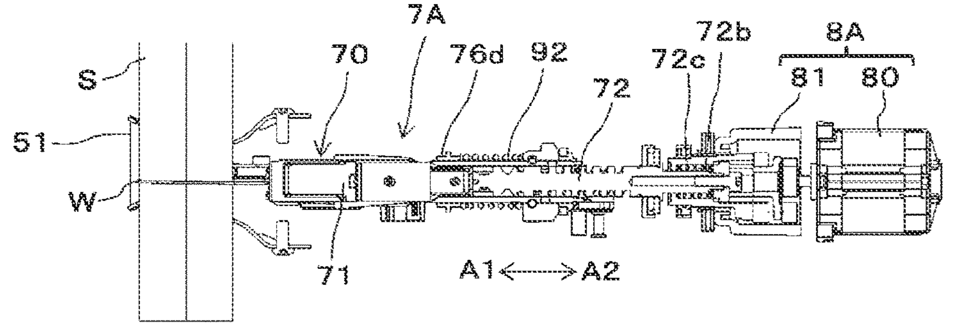
FIG. 8B is a top sectional view of main parts of the reinforcing bar binding machine of the first embodiment.
Figure 8C:
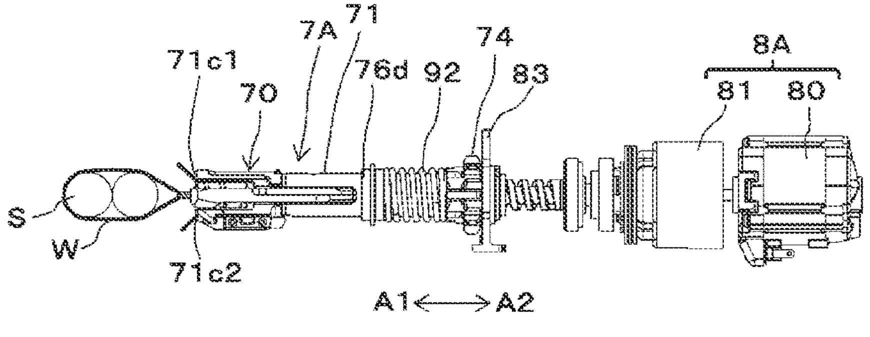
FIG. 8C is a side view of main parts of the binding unit and the drive unit of the reinforcing bar binding machine of the first embodiment.

FIG. 8A is a side view of main parts of the reinforcing bar binding machine of the first embodiment, FIG. 8B is a top sectional view of main parts of the reinforcing bar binding machine of the first embodiment, taken along a line F-F of FIG. 8A, and FIG. 8C is a side view of main parts of the binding unit and the drive unit of the reinforcing bar binding machine of the first embodiment, depicting operations during twisting of the wire.

Figure 9A:
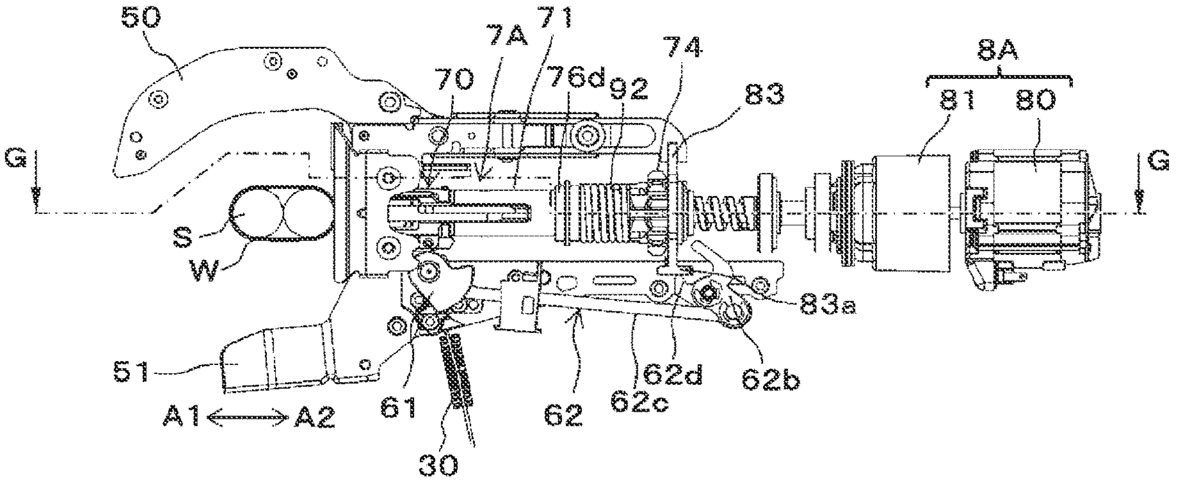
FIG. 9A is a side view of main parts of the reinforcing bar binding machine of the first embodiment.
Figure 9B:
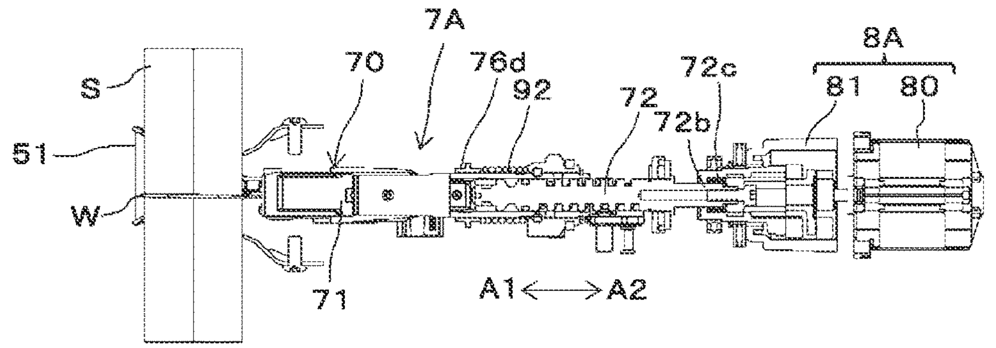
FIG. 9B is a top sectional view of main parts of the reinforcing bar binding machine of the first embodiment.
Figure 9C:
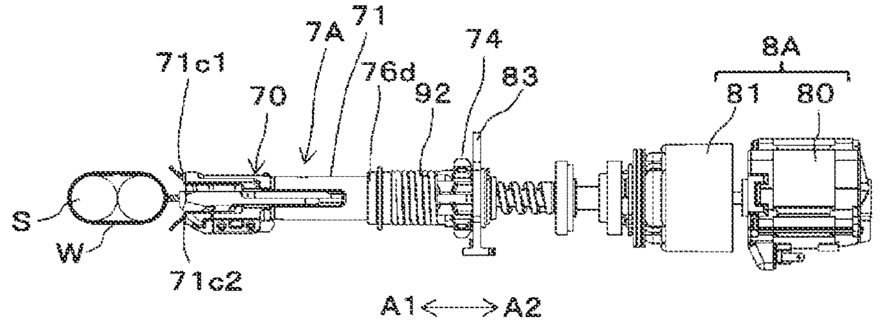
FIG. 9C is a side view of main parts of the binding unit and the drive unit of the reinforcing bar binding machine of the first embodiment.

FIG. 9A is a side view of main parts of the reinforcing bar binding machine of the first embodiment, FIG. 9B is a top sectional view of main parts of the reinforcing bar binding machine of the first embodiment, taken along a line G-G of FIG. 9A, and FIG. 9C is a side view of main parts of the binding unit and the drive unit of the reinforcing bar binding machine of the first embodiment, depicting operations during twisting of the wire.

Subsequently, the operation of binding the reinforcing bars S with the wire W by the reinforcing bar binding machine 1A of the first embodiment is described with reference to the respective drawings.

The reinforcing bar binding machine 1A is in a standby state where the wire W is sandwiched between the pair of feeding gears 30 and the tip end of the wire W is positioned between the sandwiched position by the feeding gear 30 and the fixed blade part 60 of the cutting unit 6A. Also, as shown in FIG. 2B and the like, when the reinforcing bar binding machine 1A is in the standby state, the sleeve 71 and the wire engaging body 70 whose the first side hook 70L, the second side hook 70R and the center hook 70C are attached to the sleeve 71 move in the backward direction denoted with the arrow A2, and the first side hook 70L is opened with respect to the center hook 70C and the second side hook 70R is opened with respect to the center hook 70C. Also, when the reinforcing bar binding machine 1A is in the standby state, the rotation regulation blade 74*a* separates from the tension applying spring 92, so that the sleeve 71 and the wire engaging body 70 are not urged backward by the tension applying spring 92.

When the reinforcing bars S are inserted between the curl guide 50 and the induction guide 51 of the curl forming unit 5A and the trigger 12A is operated, the feeding motor (not shown) is driven in the forward rotation direction, so that the wire W is fed in the forward direction denoted with the arrow F by the wire feeding unit 3A, as shown in FIGS. 3A to 3C.

In a configuration where a plurality of, for example, two wires W are fed, the two wire W are fed aligned in parallel along an axis direction of the loop Ru, which is formed by the wires W, by a wire guide (not shown).

The wire W fed in the forward direction passes between the center hook 70C and the first side hook 70L and is then fed to the curl guide 50 of the curl forming unit 5A. The wire W passes through the curl guide 50, so that it is curled to be wound around the reinforcing bars S.

The wire W curled by the curl guide 50 is guided to the induction guide 51 and is further fed in the forward direction by the wire feeding unit 3A, so that the wire is guided between the center hook 70C and the second side hook 70R by the induction guide 51. The wire W is fed until the tip end is butted against the feeding regulation part 90. When the wire W is fed to a position at which the tip end is butted against the feeding regulation part 90, the drive of the feeding motor (not shown) is stopped.

After the feeding of the wire W in the forward direction is stopped, the motor 80 is driven in the forward rotation direction. In the first operation area where the wire W is engaged by the wire engaging body 70, the rotation regulation blade 74*a* is engaged to the rotation regulation claw 74*b*, so that the rotation of the sleeve 71 in conjunction with the rotation of the rotary shaft 72 is regulated. Thereby, as shown in FIGS. 4A to 4C, the rotation of the motor 80 is converted into linear movement, so that the sleeve 71 is moved in the forward direction denoted with the arrow A1.

When the sleeve 71 is moved in the forward direction, the opening/closing pin 71*a* passes through the opening/closing guide holes 73. Thereby, the first side hook 70L is moved toward the center hook 70C by the rotating operation about the shaft 71*b* as a support point. When the first side hook 70L is closed with respect to the center hook 70C, the wire W sandwiched between the first side hook 70L and the center hook 70C is engaged in such a manner that the wire can move between the first side hook 70L and the center hook 70C.

Also, the second side hook 70R is moved toward the center hook 70C by the rotating operation about the shaft 71*b* as a support point. When the second side hook 70R is closed with respect to the center hook 70C, the wire W sandwiched between the second side hook 70R and the center hook 70C is engaged is in such a manner that the wire cannot come off between the second side hook 70R and the center hook 70C. In the reinforcing bar binding machine 1A, in the first operation area where the wire W is engaged by the wire engaging body 70, the sleeve 71 and the wire engaging body 70 are not urged backward by the tension applying spring 92, and the load by the tension applying spring 92 is not applied in an operation in which the sleeve 71 and the wire engaging body 70 move in the forward direction denoted with the arrow A1.

After the sleeve 71 is advanced to a position at which the wire W is engaged by the closing operation of the first side hook 70L and the second side hook 70R, the rotation of the motor 80 is temporarily stopped and the feeding motor (not shown) is driven in the reverse rotation direction.

Thereby, as shown in FIGS. 5A to 5C, the pair of feeding motors 30 is reversely rotated and the wire W sandwiched between the pair of feeding gears 30 is fed in the reverse direction denoted with the arrow R. Since the tip end-side of the wire W is engaged in such a manner that the wire cannot come off between the second side hook 70R and the center hook 70C, the wire W is wound on the reinforcing bars S by the operation of feeding the wire W in the reverse direction.

After the wire W is wound on the reinforcing bars S and the drive of the feeding motor (not shown) in the reverse rotation direction is stopped, the motor 80 is driven in the forward rotation direction, so that the sleeve 71 is further moved in the forward direction denoted with the arrow A1. As shown in FIGS. 6A to 6C, the forward movement of the sleeve 71 is transmitted to the cutting unit 6A by the transmission mechanism 62, so that the movable blade part 61 is rotated and the wire W engaged by the first side hook 70L and the center hook 70C is cut by the operation of the fixed blade part 60 and the movable blade part 61. In the reinforcing bar binding machine 1A, in the operation area where the sleeve 71 and the wire engaging body 70 are moved forward to cut the wire W, the rotation regulation blade 74*a* is contacted to the tension applying spring 92 and the tension applying spring 92 is compressed between the support frame 76*d* and the rotation regulation blade 74*a*, so that the sleeve 71 and the wire engaging body 70 are urged backward by the tension applying spring 92.

When the wire W is cut, the load applied to the movable blade part 61 disappears. The movable blade part 61 is connected to the sleeve 71 via the second link 62*c*, the first link 62*b* and the engaged portion 62*d* of the transmission mechanism 62, the engaging portion 83*a* and the movable member 83. Thereby, when the load applied to the movable blade part 61 disappears, the force with which the movement of the sleeve 71 is regulated by the load applied to the movable blade part 61 is lowered.

In the operation of winding the wire W on the reinforcing bars S, the tension applied to the wire W increases because the tip end-side of the wire W is engaged in such a manner that it cannot come off from between the second side hook 70R and the center hook 70C. Thereby, the force of moving forward the sleeve 71 by the reaction force of the tension applied to the wire W is applied to the sleeve 71. For this reason, when the wire W is cut, the load applied to the movable blade part 61 disappears and the force of regulating the movement of the sleeve 71 by the load applied to the movable blade part 61 is lowered, the sleeve 71 intends to move forward.

When the sleeve 71 moves forward, the force of pulling backward the wire W engaged by the wire engaging body 70 whose the center hook 70C, the first side hook 70L and the second side hook 70R are attached to the sleeve 71 is lowered, so that the wire W wound on the reinforcing bars S is loosened before it is twisted.

In contrast, according to the present embodiment, in the operation area where the wire W is cut, the sleeve 71 is urged backward by the tension applying spring 92 compressed between the support frame 76*d* and the rotation regulation blade 74*a* by the forward movement operation of the sleeve 71. The compressed tension applying spring 92 is extended, so that the force of urging backward the sleeve 71 is stronger than the reaction force of the tension applied to the wire W as a result of the wire W being wound on the reinforcing bars S. For this reason, even when the wire W is cut, the load applied to the movable blade part 61 disappears and the force of regulating the movement of the sleeve 71 by the load applied to the movable blade part 61 is lowered, the forward movement of the sleeve 71 is suppressed.

The forward movement of the sleeve 71 is suppressed, so that the force of pulling backward the wire W engaged by the wire engaging body 70 is suppressed from being lowered. Thereby, the tension that is applied to the wire W by the operations of feeding the wire W in the reverse direction and winding the wire W on the reinforcing bars S is maintained, so that the wire W wound on the reinforcing bars S is suppressed from being loosened before the wire is twisted. Since the tension applying spring 92 has such a configuration that the coil spring is provided on the outer periphery of the sleeve 71, there are few restrictions on a diameter and the like of the spring, and the urging force can be increased.

In the reinforcing bar binding machine 1A, as described above, in the operation area where the wire W is cut, the sleeve 71 and the wire engaging body 70 are urged backward by the tension applying spring 92, so that even when the wire W is cut, the load applied to the movable blade part 61 disappears and the force of regulating the movement of the sleeve 71 by the load applied to the movable blade part 61 is lowered, the forward movement of the sleeve 71 can be suppressed. Note that, in the first operation area where the wire W is engaged by the wire engaging body 70, when the sleeve 71 and the wire engaging body 70 are urged backward by the tension applying spring 92, the load applied to the motor 80 increases.

Therefore, when the reinforcing bar binding machine 1A is in the standby state, as described above, the rotation regulation blade 74*a* separates from the tension applying spring 92, and in the first operation area where the wire W is engaged by the wire engaging body 70, the sleeve 71 and the wire engaging body 70 are not urged backward by the tension applying spring 92. Thereby, in the first operation area where the wire W is engaged by the wire engaging body 70, the load due to the load that urges the sleeve 71 and the wire engaging body 70 backward by the tension applying spring 92 is not applied in the operation where the sleeve 71 and the wire engaging body 70 move in the forward direction denoted with the arrow A1. Therefore, it is possible to suppress the load, which is applied to the motor 80 in an area where the load by the tension applying spring 92 is not required, from increasing.

In the meantime, the rotary shaft 72 is connected to the decelerator 81 via the connection portion 72*b* having a configuration of enabling the rotary shaft 72 to rotate integrally with the decelerator 81 and to move in the axis direction with respect to the decelerator 81. In the first operation area where the wire W is engaged by the wire engaging body 70 from the standby position, the sleeve 71 and the wire engaging body 70 are not urged backward by the tension applying spring 92, so that in the first operation area, the position in the axis direction of the rotary shaft 72 cannot be regulated by the tension applying spring 92. Therefore, the connection portion 72*b* has the spring 72*c* for urging the rotary shaft 72 in the backward direction toward the decelerator 81. Thereby, the position of the rotary shaft 72 is regulated by receiving a force pushed backward by the spring 72c, unless a force of exceeding the urging force by the spring 72c and moving the rotary shaft 72 forward is applied.

Therefore, the tension applying spring 92 is provided independently of the spring 72c, so that it is possible to apply the load necessary so as to suppress the wire from being loosened in a desired area. Also, in the operation area where the wire W is cut, the sleeve 71 and the wire engaging body 70 can be urged backward by the tension applying spring 92, so that the wire W wound on the reinforcing bars S can be suppressed from being loosened before the wire is twisted. In addition to the effects, it is possible to suppress the load, which is applied to the motor 80 in an area where the load by the urging of the tension applying spring 92 is not required, from increasing, so that it is possible to suppress the load, which is applied to the motor 80 and the like during one entire binding cycle, from increasing, thereby suppressing the durability of the components from being lowered. In addition, the spring 72c is provided, so that it is possible to suppress the rotary shaft 72 from carelessly moving in the area where the urging force by the tension applying spring 92 is not applied. Note that, the spring 72c may be configured as the tension applying part by setting the force of urging backward the rotary shaft 72, which is connected to the decelerator 81 to be axially movable, by the spring 72c stronger than the reaction force of the tension that is applied to the wire W as the wire is wound on the reinforcing bars S.

The bending portions 71c1 and 71c2 are moved toward the reinforcing bars S substantially at the same time when the sleeve 71 is moved in the forward direction denoted with the arrow A1 to cut the wire W as the motor 80 is driven in the forward rotation direction. Thereby, the tip end-side of the wire W engaged by the center hook 70C and the second side hook 70R is pressed toward the reinforcing bars S and bent toward the reinforcing bars S at the engaging position as a support point by the bending portion 71c1. The sleeve 71 is further moved in the forward direction, so that the wire W engaged between the second side hook 70R and the center hook 70C is sandwiched and maintained by the bending portion 71c1.

Also, the terminal end-side of the wire W engaged by the center hook 70C and the first side hook 70L and cut by the cutting unit 6A is pressed toward the reinforcing bars S and bent toward the reinforcing bars S at the engaging point as a support point by the bending portion 71c2. The sleeve 71 is further moved in the forward direction, so that the wire W engaged between the first side hook 70L and the center hook 70C is sandwiched and maintained by the bending portion 71c2.

After the tip end-side and the terminal end-side of the wire W are bent toward the reinforcing bars S, the motor 80 is further driven in the forward rotation direction, so that the sleeve 71 is further moved in the forward direction. When the sleeve 71 is moved to a predetermined position and reaches the operation area where the wire W engaged by the wire engaging body 70 is twisted, the engaging of the rotation regulation blade 74a with the rotation regulation claw 74b is released.

Thereby, as shown in FIGS. 7A to 7C, the motor 80 is further driven in the forward rotation direction, so that the sleeve 71 rotates in conjunction with the rotary shaft 72, thereby twisting the wire W engaged by the wire engaging body 70.

In the binding unit 7A, in the second operation area where the sleeve 71 rotates to twist the wire W, the wire W engaged by the wire engaging body 70 is twisted, so that a force of pulling forward the wire engaging body 70 in the axis direction of the rotary shaft 72 is applied. In the meantime, the sleeve 71 is moved forward up to a position at which it can rotate, so that the tension applying spring 92 is further compressed and the sleeve 71 receives the force pushed backward by the tension applying spring 92.

Thereby, when a force for moving forward in the axis direction is applied to the wire engaging body 70, the wire engaging body 70 and the rotary shaft 72 are moved forward while the sleeve 71 receives the force pushed backward by the tension applying spring 92 and the rotary shaft 72 receives the force pushed backward by the spring 72c, thereby twisting the wire W while moving forward, as shown in FIGS. 8A to 8C.

Therefore, the portion of the wire W engaged by the wire engaging body 70 is pulled backward, and the tension is applied in the tangential directions of the reinforcing bars S, so that the wire W is pulled to closely contact the reinforcing bars S. In the binding unit 7A, in the second operation area where the sleeve 71 rotates to twist the wire W, when the wire engaging body 70 further rotates in conjunction with the rotary shaft 72, the wire engaging body 70 and the rotary shaft 72 move in the forward direction in which a gap between the twisted portion of the wire W and the reinforcing bar S becomes smaller, thereby further twisting the wire W.

In the second operation area where the wire W is twisted, the urging forces of the tension applying spring 92 and the spring 72c and the like are set so that the tension applied to the wire W as the portion engaged by the wire engaging body 70 is pulled backward is equal to or larger than 10% and equal to or smaller than 50% with respect to the maximum tensile load of the wire W. When the tension applied to the wire W is equal to or larger than 10% and equal to or smaller than 50% with respect to the maximum tensile load of the wire W, the loosening due to an extra part of the wire can be removed, the wire W can be closely contacted to the reinforcing bars S, and the wire W can be prevented from being carelessly cut. In addition, it is possible to suppress the unnecessarily high outputs of the motor 80 and the feeding motor (not shown). Therefore, it is possible to suppress increases in the size of the motor and the size of the entire device so as to make the device sturdy, which leads to improvement on a handling property as a product. The maximum tensile load of a wire means the maximum load that the wire cam withstand in a tensile test.

Therefore, as shown in FIGS. 9A to 9C, the wire W is twisted as the wire engaging body 70 and the rotary shaft 72 are moved forward with receiving the force pushed backward by the tension applying spring 92 and the spring 72c, so that the gap between the twisted portion of the wire W and the reinforcing bars S is reduced and the wire is closely contacted to the reinforcing bar S in a manner of following the reinforcing bar S. Thereby, the loosening before the wire W is twisted is removed, so that it is possible to perform the binding in the state where the wire W is closely contacted to the reinforcing bars S.

When it is detected that a maximum load is applied to the motor 80 as a result of twisting of the wire W, the rotation of the motor 80 in the forward direction is stopped. Then, the motor 80 is driven in the reverse rotation direction, so that the rotary shaft 72 is reversely rotated. When the sleeve 71 is reversely rotated according to the reverse rotation of the rotary shaft 72, the rotation regulation blade 74a is engaged to the rotation regulation claw 74b, so that the rotation of the sleeve 71 in conjunction with the rotation of the rotary shaft

72 is regulated. Thereby, the sleeve 71 is moved in the backward direction denoted with the arrow A2.

When the sleeve 71 is moved backward, the bending portions 71*c*1 and 71*c*2 separate from the wire W and the engaged state of the wire W by the bending portions 71*c*1 and 71*c*2 is released. Also, when the sleeve 71 is moved backward, the opening/closing pin 71*a* passes through the opening/closing guide holes 73. Thereby, the first side hook 70L is moved away from the center hook 70C by the rotating operation about the shaft 71*b* as a support point. The second side hook 70R is also moved away from the center hook 70C by the rotating operation about the shaft 71*b* as a support point. Thereby, the wire W comes off from the wire engaging body 70.

<Configuration Example of Reinforcing Bar Binding Machine of Second Embodiment>

Figure 10A:
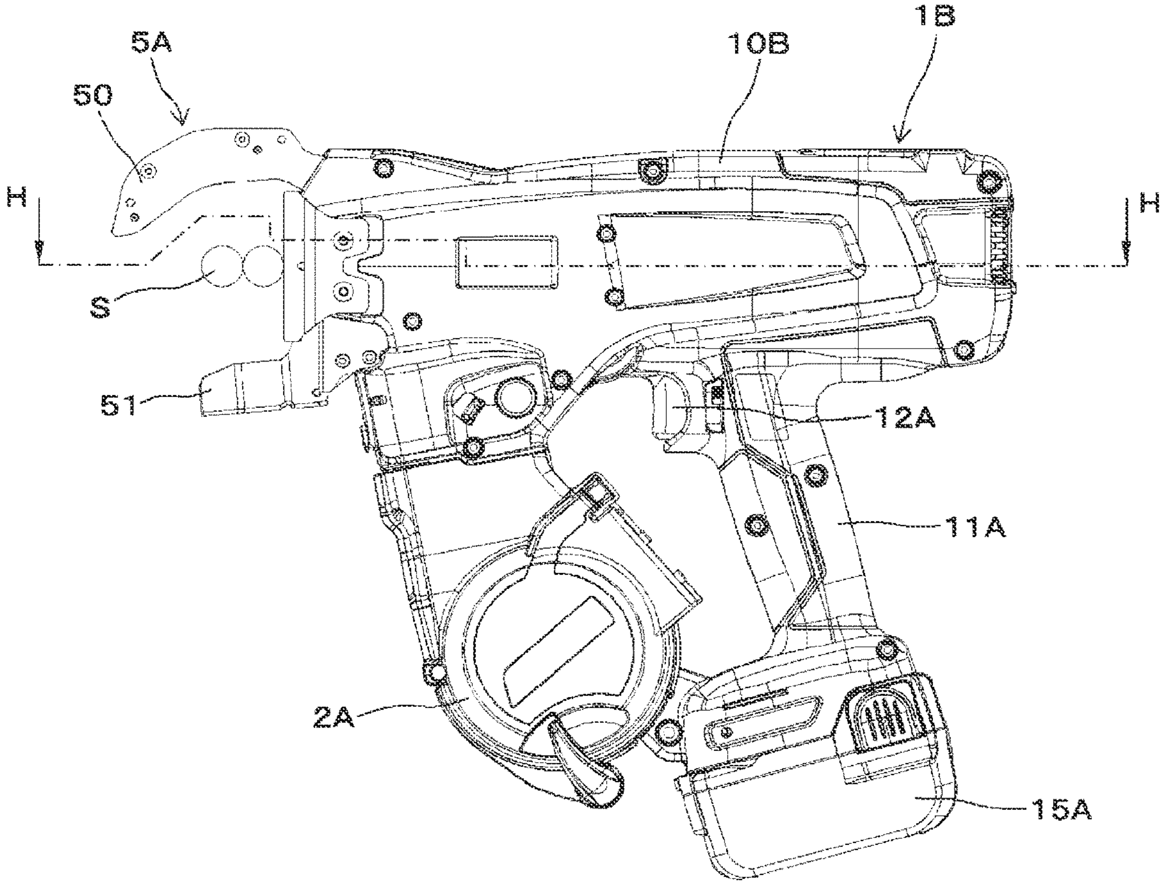
FIG. 10A is a side view depicting an example of a reinforcing bar binding machine of a second embodiment.
Figure 10B:
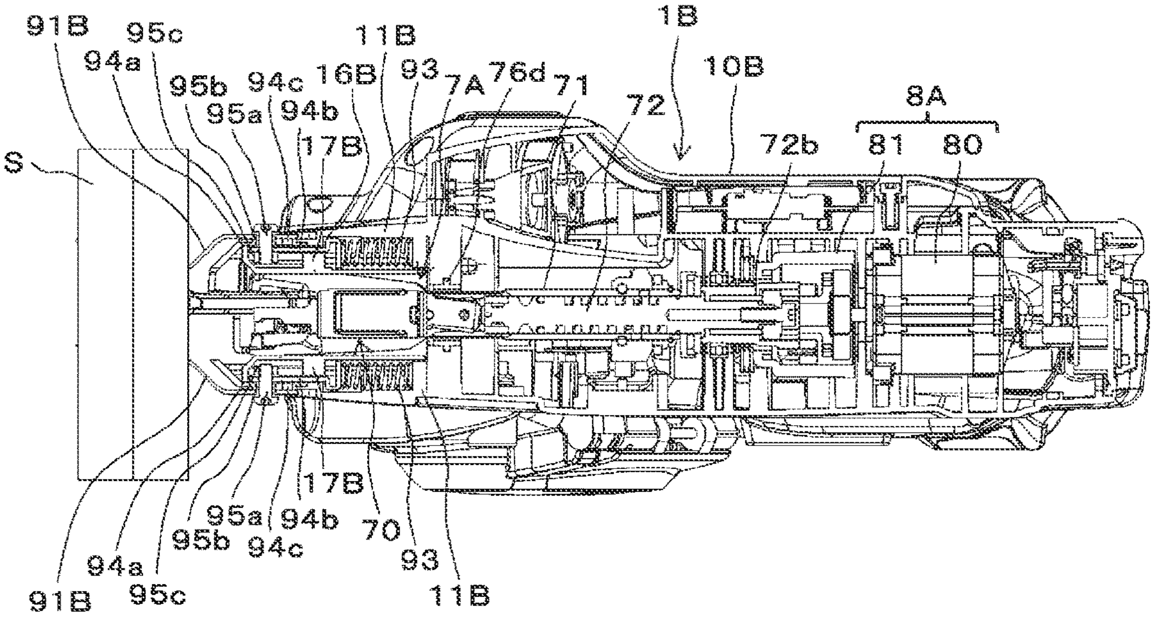
FIG. 10B is atop sectional view of the reinforcing bar binding machine of the second embodiment.

FIG. 10A is a side view depicting an example of a reinforcing bar binding machine of a second embodiment, and FIG. 10B is a top sectional view of the reinforcing bar binding machine of the second embodiment, taken along a line H-H of FIG. 10A. Note that, as for the reinforcing bar binding machine of the second embodiment, the same configurations as the reinforcing bar binding machine of the first embodiment are denoted with the same reference signs, and the detailed descriptions thereof are omitted.

A reinforcing bar binding machine 1B of the second embodiment includes a butting part 91B against which the reinforcing bars S are butted, and a tension applying spring 93 for urging the butting part 91B. The butting part 91B and the tension applying spring 93 are an example of the tension applying part that is the tension applying mechanism of the second embodiment, and the butting part 91B is provided to be movable in the front and rear direction denoted with the arrows A1 and A2 at an end portion on the front side of the main body part 10B between the curl guide 50 and the induction guide 51. The butting part 91B is also urged in the forward direction denoted with the arrow A1 by the tension applying spring 93.

Figure 11A:
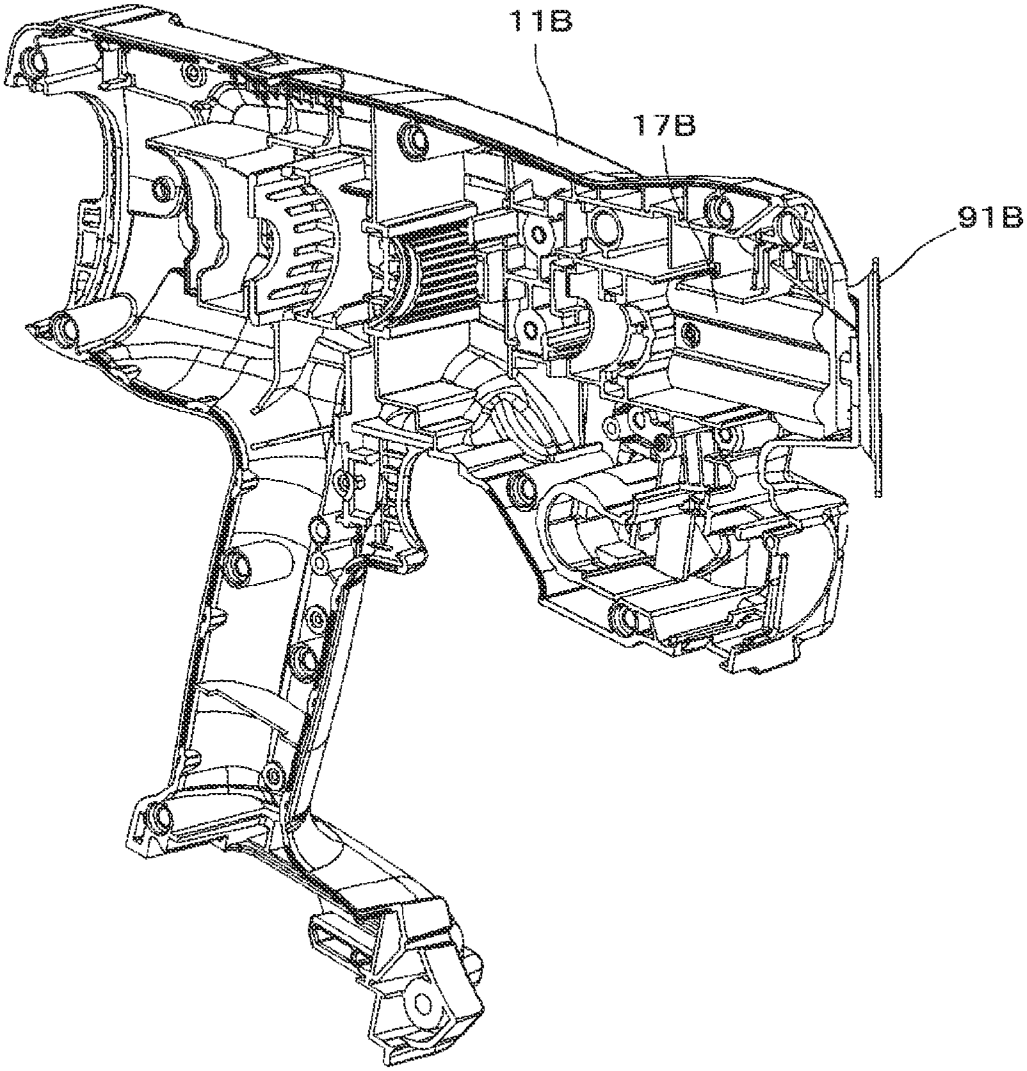
FIG. 11A is a perspective view depicting an attachment structure of a butting part and a tension applying spring.
Figure 11B:
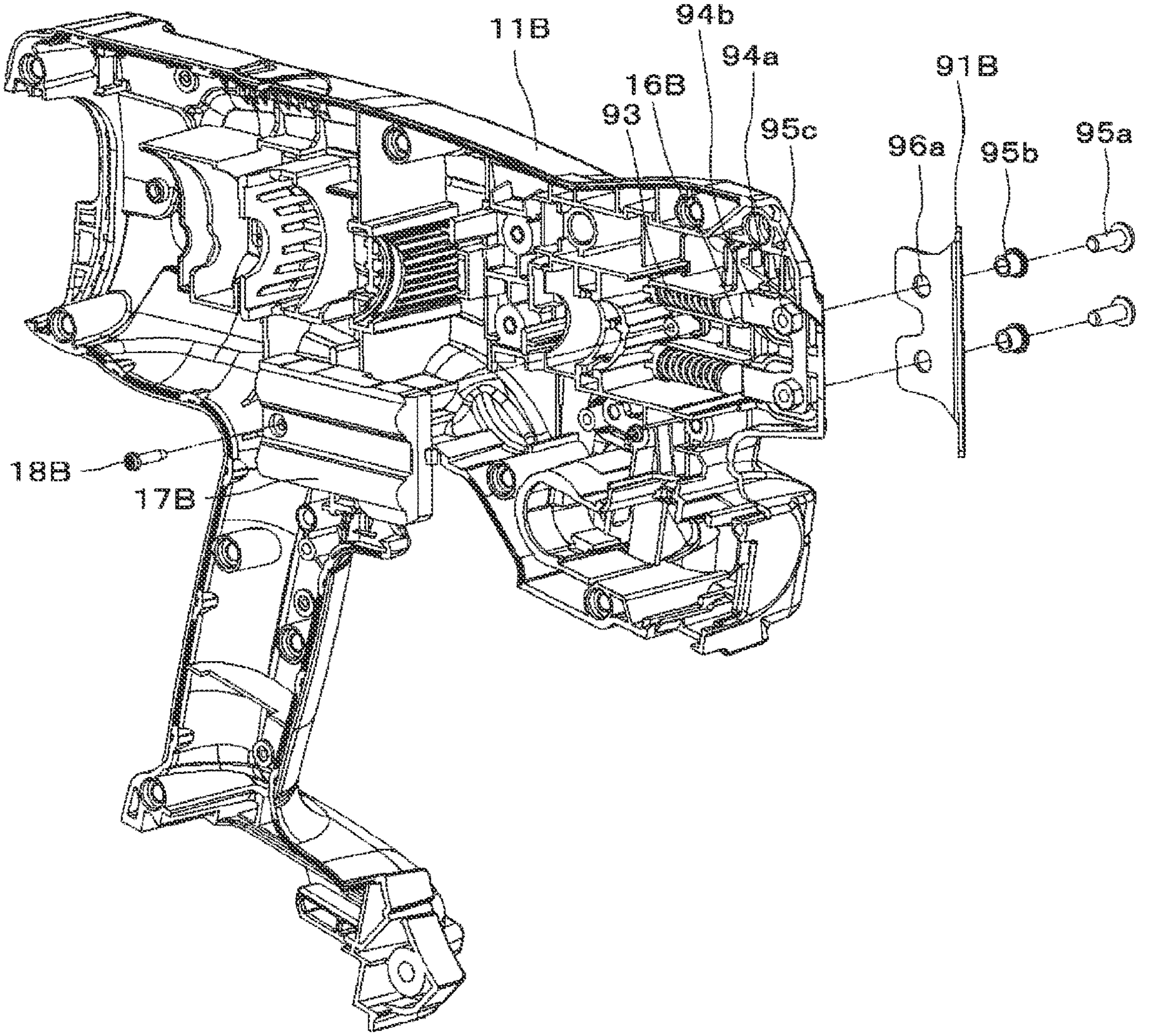
FIG. 11B is an exploded perspective view depicting the attachment structure of the butting part and the tension applying spring.

FIG. 11A is a perspective view depicting an attachment structure of the butting part and the tension applying spring, and FIG. 11B is an exploded perspective view depicting the attachment structure of the butting part and the tension applying spring.

The main body part 10B has a housing 11B divided in the right and left direction. Each housing 11B has an attachment part 16B of the butting part 91B and the tension applying spring 93 inside the end portion on the front side.

The butting part 91B is attached to a second guide plate 94*b* via a first guide plate 94*a* configured to regulate a moving direction of the butting part 91B. The first guide plate 94*a* is provided with a long hole portion 94*c* for regulating the moving direction of the butting part 91B, and is fitted to the attachment part 16B of the housing 11B.

Hollow pins 95*b* through which screws 95*a* pass are enabled to pass through hole portions 96*a* formed in two upper and lower places of the butting part 91B, and the screws 95*a* and the hollow pins 95*b* passing through the butting part 91B are enabled to pass through the long hole portion 94*c* of the first guide plate 94*a* fitted to the housing 11B. The screws 95*a* protruding from the hollow pins 95*b* pass through the second guide plate 94*b* put in the attachment part 16B, and are then fastened with nuts 95*c*.

The tension applying spring 93 is put in the attachment part 16B with being pushed and compressed by the second guide plate 94*b*. A cover 17B covering the attachment part 16B is attached to the housing 11B by a screw 18B, so that the first guide plate 94*a* is fixed to the housing 11B, the second guide plate 94*b* is supported so as to be movable and the tension applying spring 93 is supported so as to be compressible and expandable.

Thereby, the butting part 91B is supported so as to be movable in the front and rear direction denoted with the arrows A1 and A2 together with the second guide plate 94*b* along the shape of the long hole portion 94*c* of the first guide plate 94*a*. The butting part 91B is also urged in the forward direction denoted with the arrow A1 by the tension applying spring 93.

Therefore, in the reinforcing bar binding machine 1B, the butting part 91B and the tension applying spring 93 urge forward the reinforcing bars S butted against the butting part 91B. That is, the tension applying spring 93 urges the reinforcing bars S butted against the butting part 91B and the wire engaging body 70 engaging the wire W at the binding unit 7A in a direction getting away from each other. The tension applying spring 93 applies the tension to the wire W wound on the reinforcing bars S and cut at the cutting unit 6A with a force higher than a force applied in a loosening direction of the wire W wound on the reinforcing bars S, thereby enabling binding in a state where the wire W is applied with the tension.

Note that, in the reinforcing bar binding machine 1B of the second embodiment, the rotary shaft 72 is connected to the decelerator 81 in a state where the axial movement is regulated.

<Example of Operation of Reinforcing Bar Binding Machine of Second Embodiment>

Figure 12A:
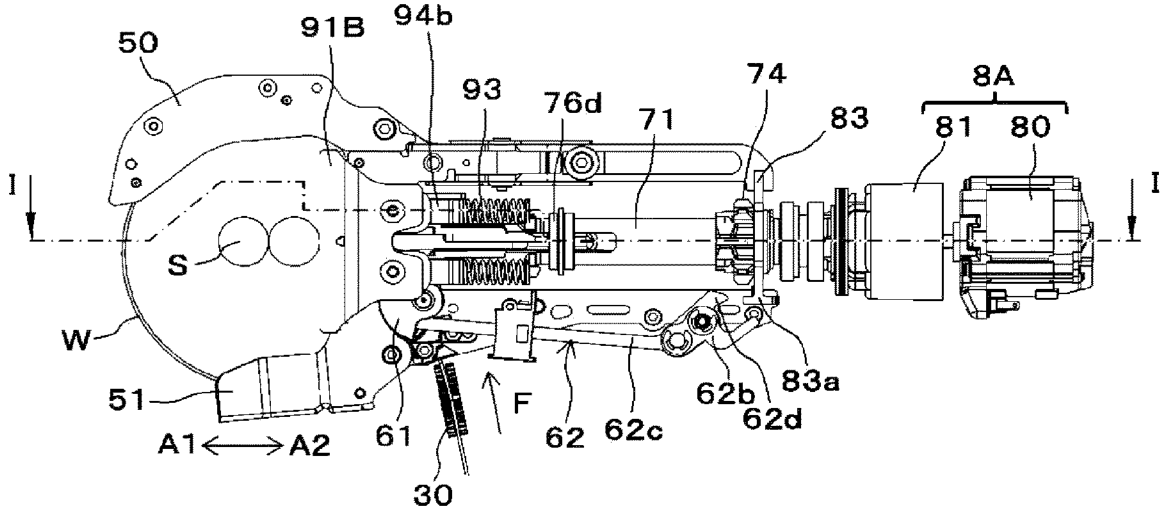
FIG. 12A is a side view of main parts of the reinforcing bar binding machine of the second embodiment.
Figure 12B:
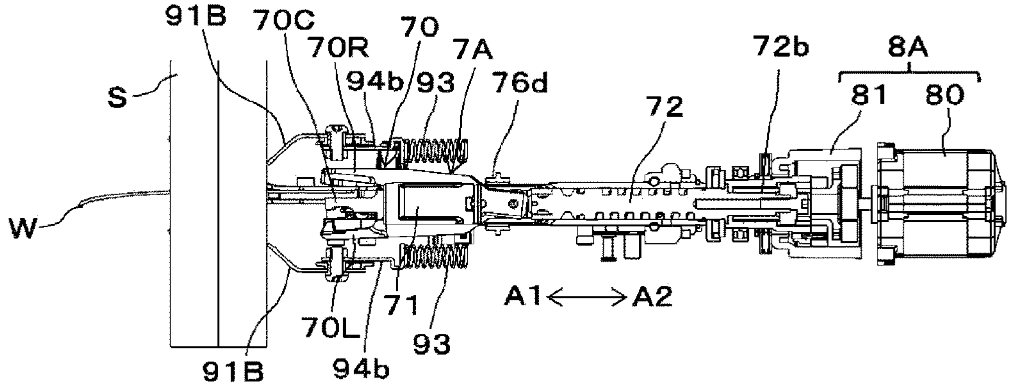
FIG. 12B is a top sectional view of main parts of the reinforcing bar binding machine of the second embodiment.
Figure 12C:
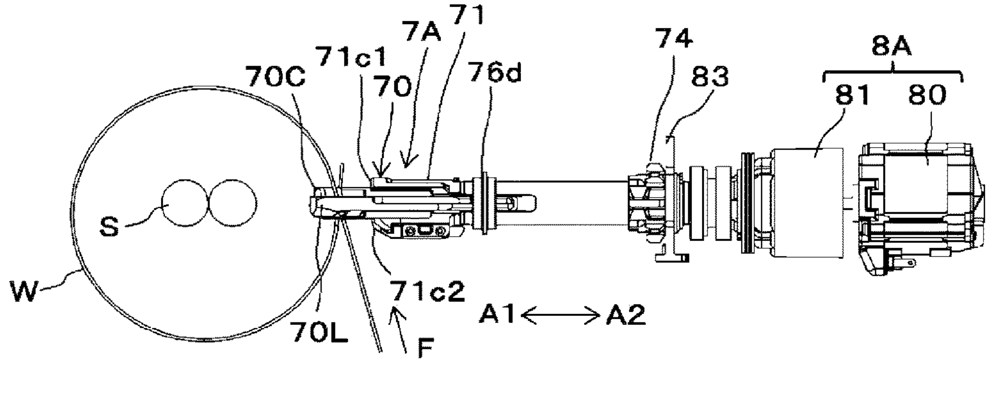
FIG. 12C is a side view of main parts of a binding unit and a drive unit of the reinforcing bar binding machine of the second embodiment.

FIG. 12A is a side view of main parts of the reinforcing bar binding machine of the second embodiment, FIG. 12B is a top sectional view of main parts of the reinforcing bar binding machine of the second embodiment, taken along a line I-I of FIG. 12A, and FIG. 12C is a side view of main parts of a binding unit and a drive unit of the reinforcing bar binding machine of the second embodiment, depicting operations during feeding of the wire.

Figure 13A:
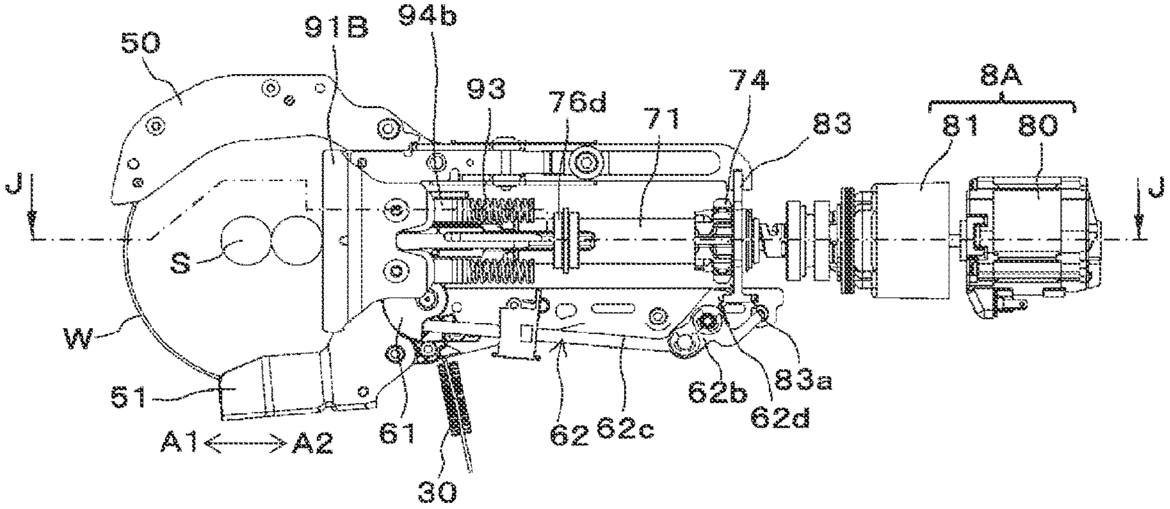
FIG. 13A is a side view of main parts of the reinforcing bar binding machine of the second embodiment.
Figure 13B:
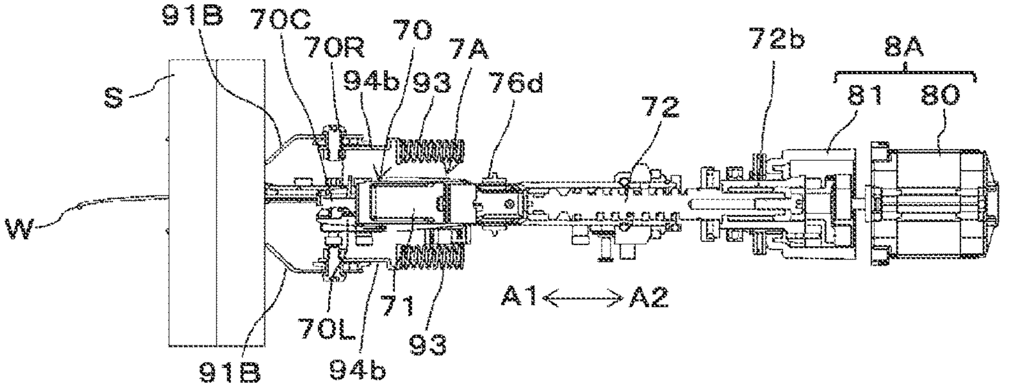
FIG. 13B is a top sectional view of main parts of the reinforcing bar binding machine of the second embodiment.
Figure 13C:
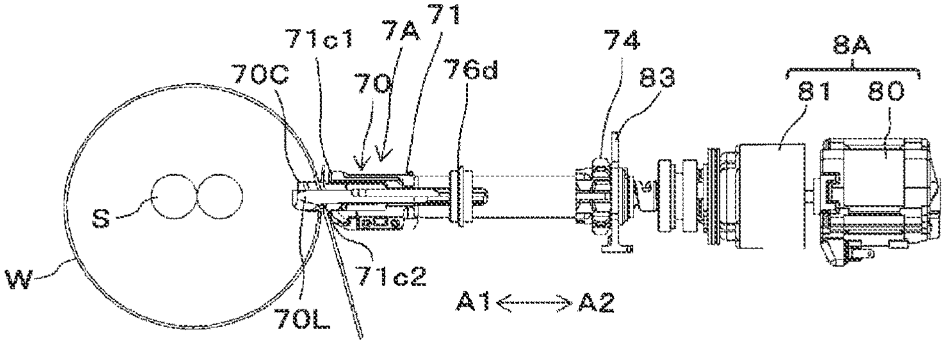
FIG. 13C is a side view of main parts of the binding unit and the drive unit of the reinforcing bar binding machine of the second embodiment.

FIG. 13A is a side view of main parts of the reinforcing bar binding machine of the second embodiment, FIG. 13B is a top sectional view of main parts of the reinforcing bar binding machine of the second embodiment, taken along a line J-J of FIG. 13A, and FIG. 13C is a side view of main parts of the binding unit and the drive unit of the reinforcing bar binding machine of the second embodiment, depicting operations during engaging of the wire.

Figure 14A:
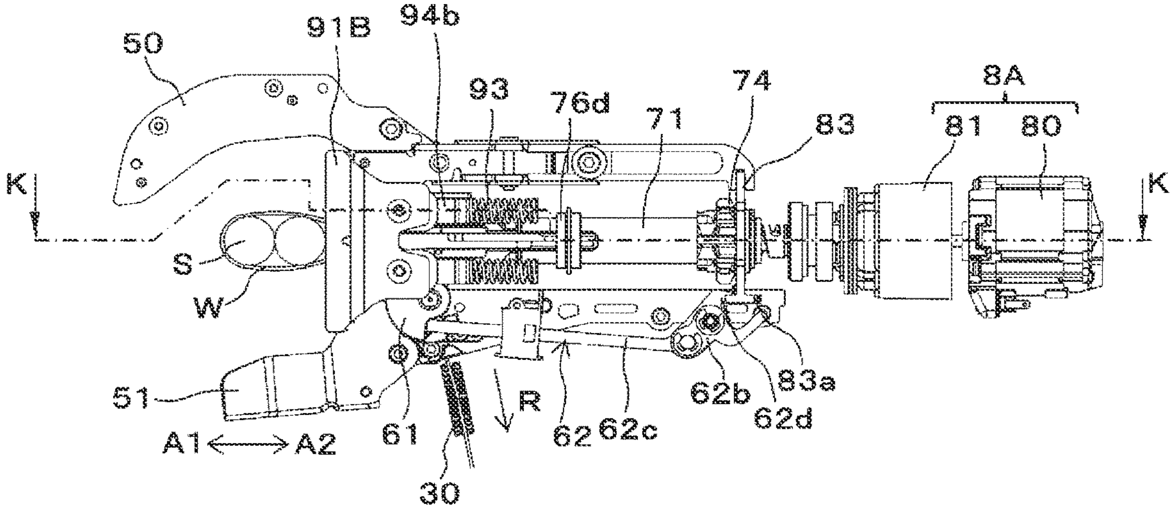
FIG. 14A is a side view of main parts of the reinforcing bar binding machine of the second embodiment.
Figure 14B:
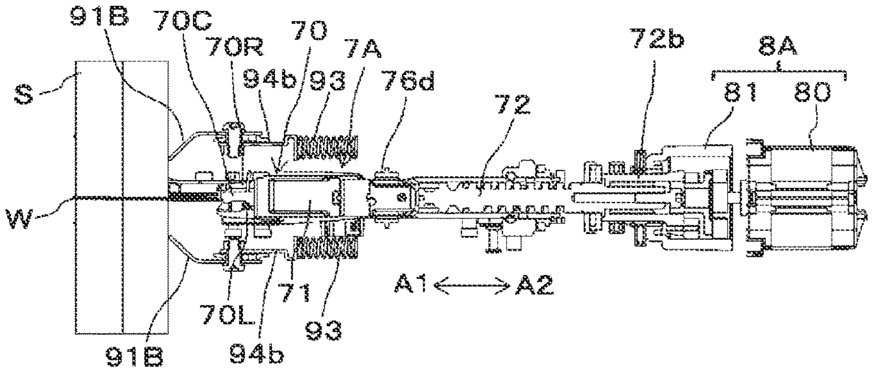
FIG. 14B is a top sectional view of main parts of the reinforcing bar binding machine of the second embodiment.
Figure 14C:
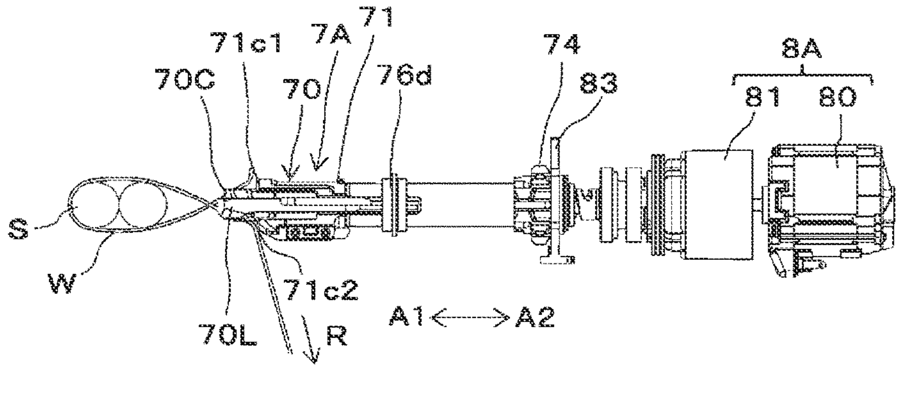
FIG. 14C is a side view of main parts of the binding unit and the drive unit of the reinforcing bar binding machine of the second embodiment.

FIG. 14A is a side view of main parts of the reinforcing bar binding machine of the second embodiment, FIG. 14B is a top sectional view of main parts of the reinforcing bar binding machine of the second embodiment, taken along a line K-K of FIG. 14A, and FIG. 14C is a side view of main parts of the binding unit and the drive unit of the reinforcing bar binding machine of the second embodiment, depicting operations during reverse feeding of the wire.

Figure 15A:
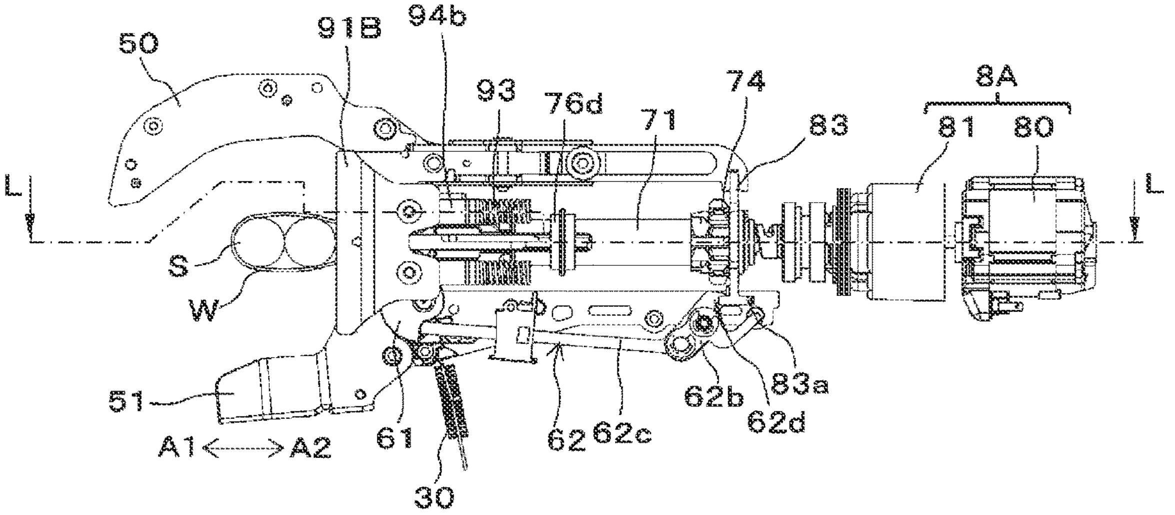
FIG. 15A is a side view of main parts of the reinforcing bar binding machine of the second embodiment.
Figure 15B:
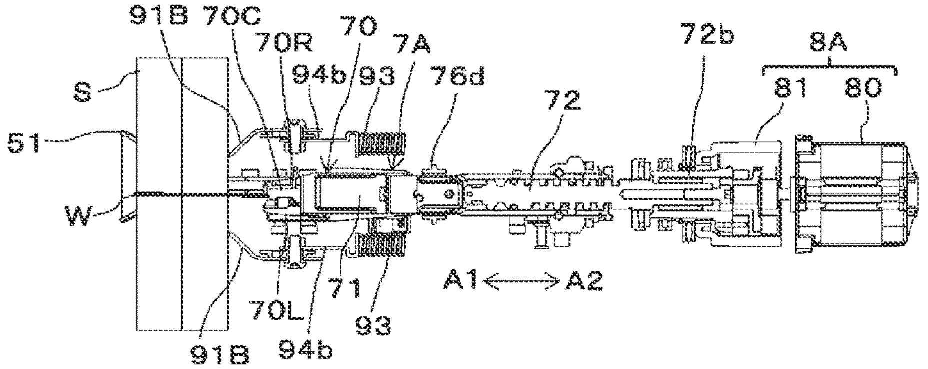
FIG. 15B is a top sectional view of main parts of the reinforcing bar binding machine of the second embodiment.
Figure 15C:
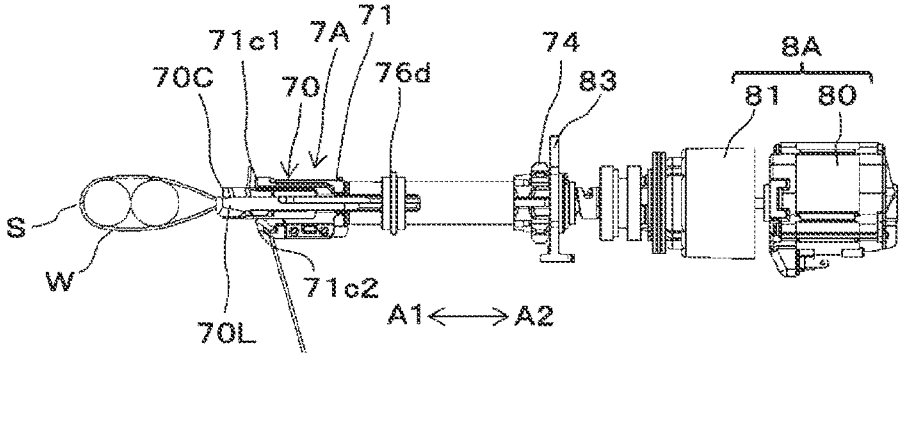
FIG. 15C is a side view of main parts of the binding unit and the drive unit of the reinforcing bar binding machine of the second embodiment.

FIG. 15A is a side view of main parts of the reinforcing bar binding machine of the second embodiment, FIG. 15B is a top sectional view of main parts of the reinforcing bar binding machine of the second embodiment, taken along a line L-L of FIG. 15A, and FIG. 15C is a side view of main parts of the binding unit and the drive unit of the reinforcing bar binding machine of the second embodiment, depicting operations during tension applying by reverse feeding of the wire.

Figure 16A:
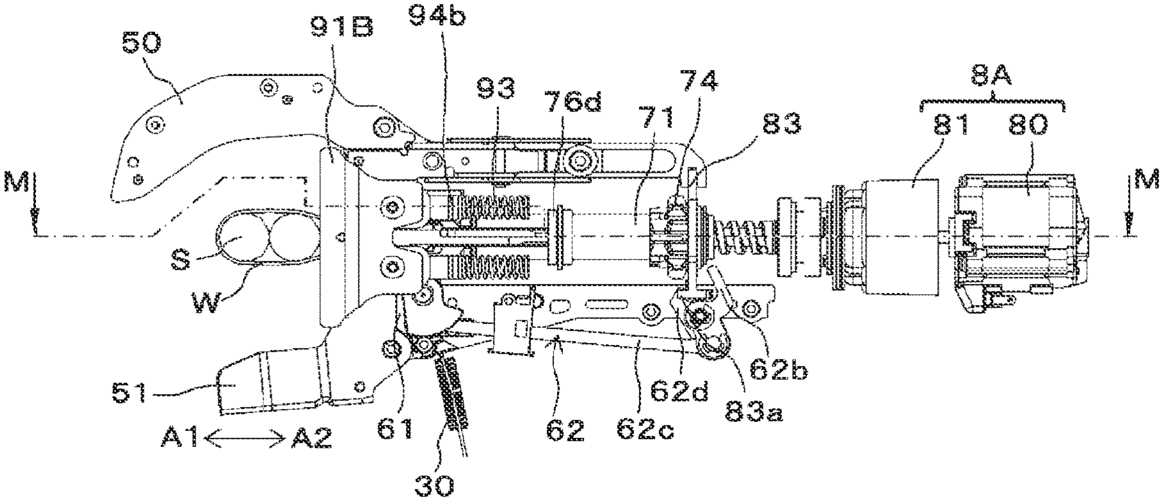
FIG. 16A is a side view of main parts of the reinforcing bar binding machine of the second embodiment.
Figure 16B:
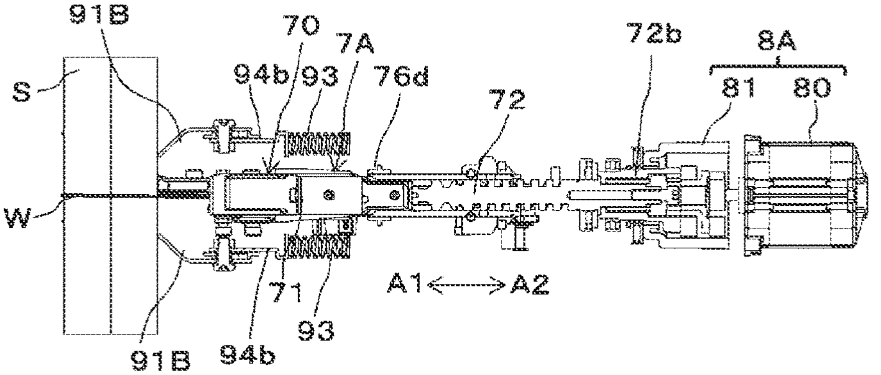
FIG. 16B is a top sectional view of main parts of the reinforcing bar binding machine of the second embodiment.
Figure 16C:
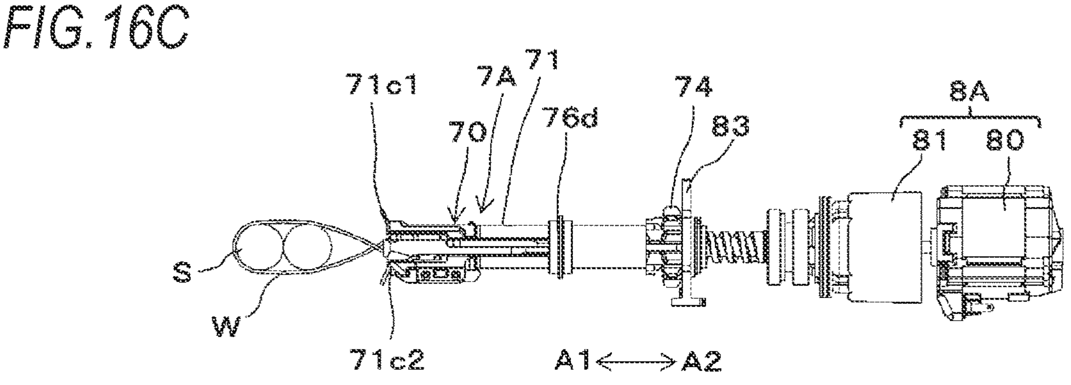
FIG. 16C is a side view of main parts of the binding unit and the drive unit of the reinforcing bar binding machine of the second embodiment.

FIG. 16A is a side view of main parts of the reinforcing bar binding machine of the second embodiment, FIG. 16B is a top sectional view of main parts of the reinforcing bar binding machine of the second embodiment, taken along a line M-M of FIG. 16A, and FIG. 16C is a side view of main parts of the binding unit and the drive unit of the reinforcing bar binding machine of the second embodiment, depicting operations during cutting and bending of the wire.

Figure 17A:
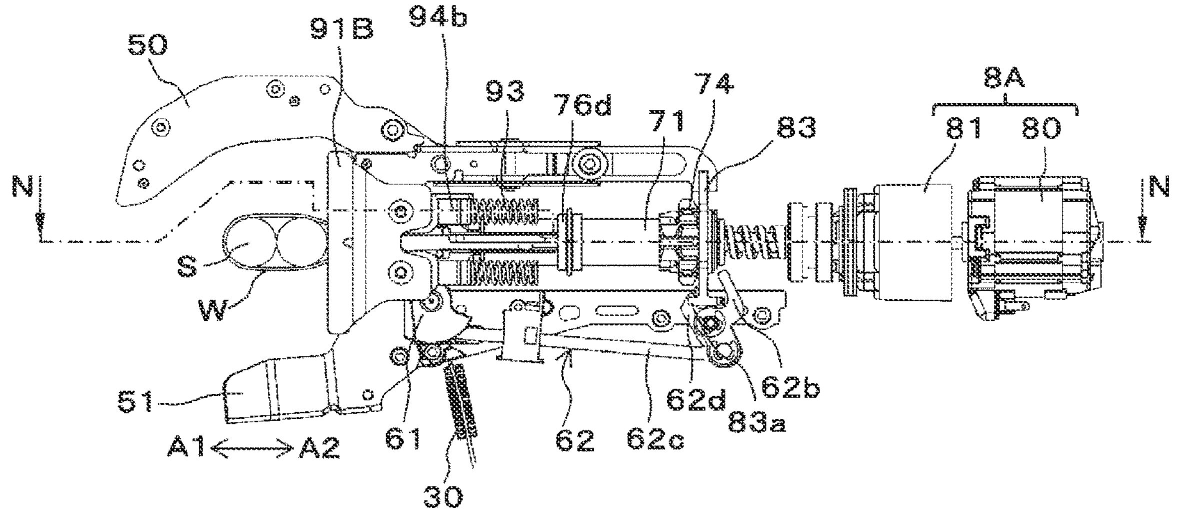
FIG. 17A is a side view of main parts of the reinforcing bar binding machine of the second embodiment.
Figure 17B:
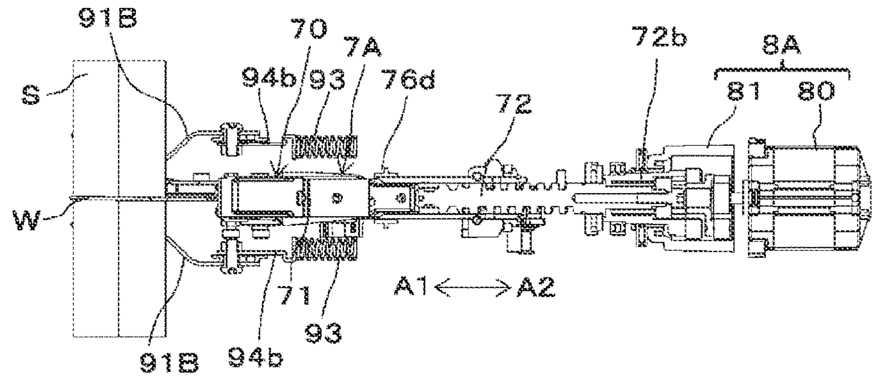
FIG. 17B is a top sectional view of main parts of the reinforcing bar binding machine of the second embodiment.
Figure 17C:
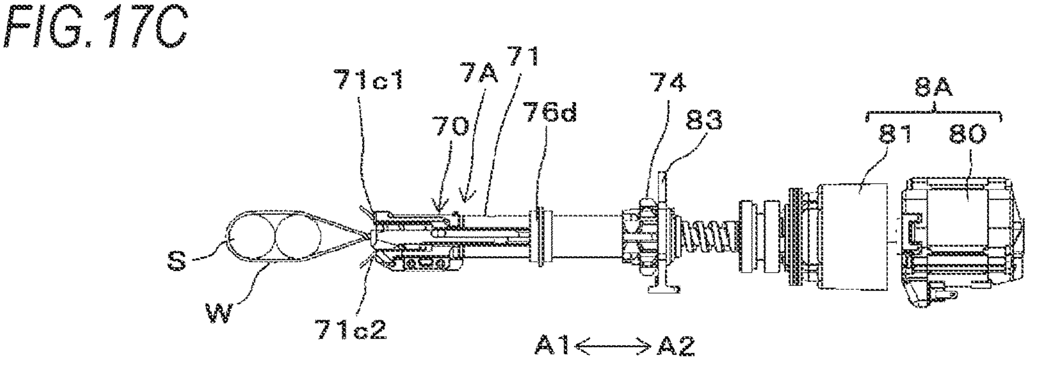
FIG. 17C is a side view of main parts of the binding unit and the drive unit of the reinforcing bar binding machine of the second embodiment.

FIG. 17A is a side view of main parts of the reinforcing bar binding machine of the second embodiment, FIG. 17B is a top sectional view of main parts of the reinforcing bar binding machine of the second embodiment, taken along a line N-N of FIG. 17A, and FIG. 17C is a side view of main parts of the binding unit and the drive unit of the reinforcing bar binding machine of the second embodiment, depicting operations during twisting of the wire.

Figure 18A:
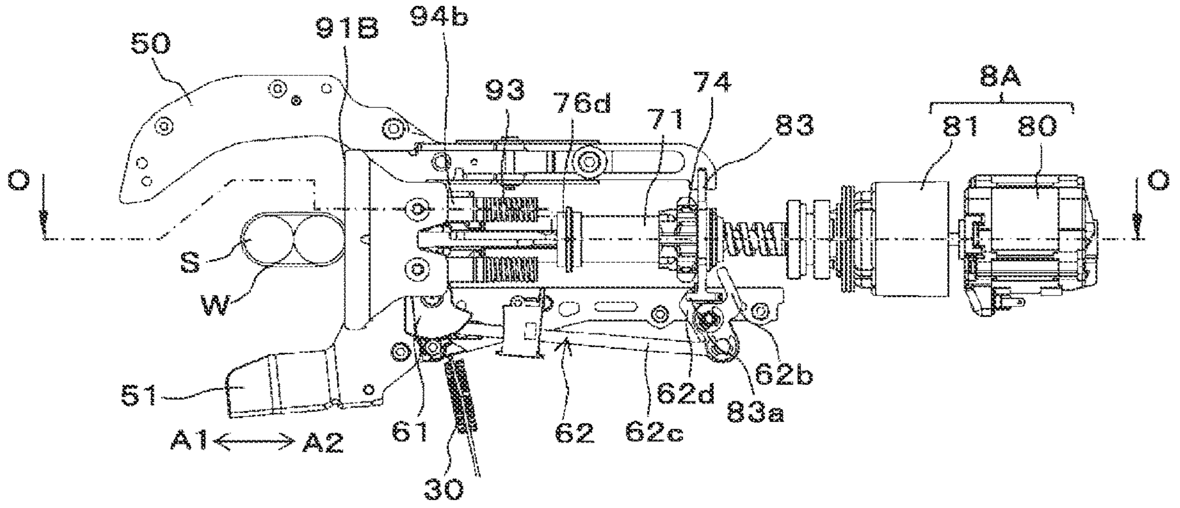
FIG. 18A is a side view of main parts of the reinforcing bar binding machine of the second embodiment.
Figure 18B:
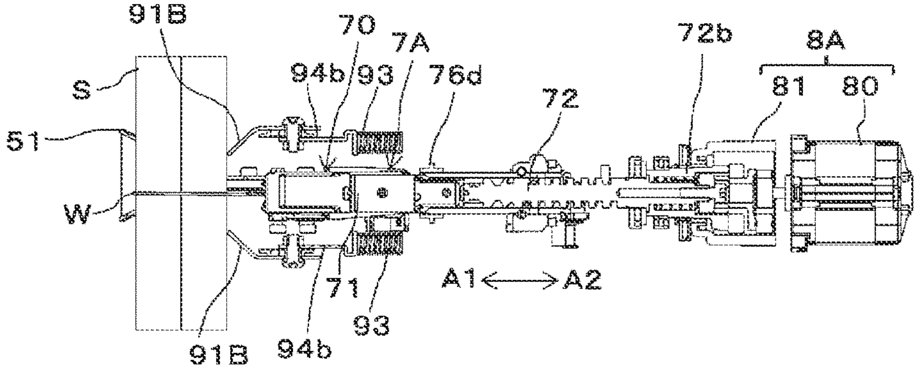
FIG. 18B is a top sectional view of main parts of the reinforcing bar binding machine of the second embodiment.
Figure 18C:
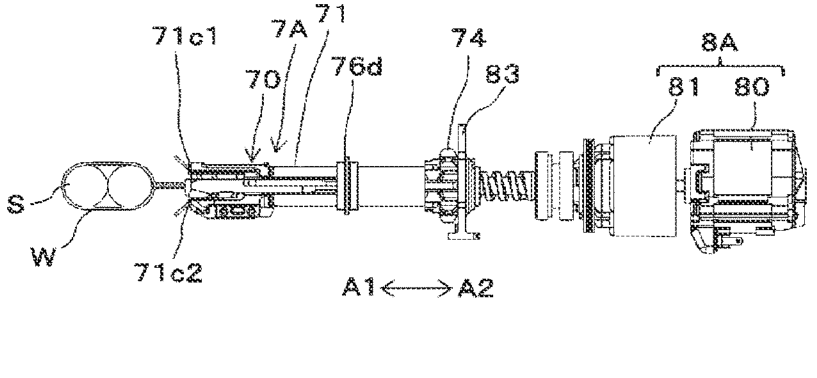
FIG. 18C is a side view of main parts of the binding unit and the drive unit of the reinforcing bar binding machine of the second embodiment.

FIG. 18A is a side view of main parts of the reinforcing bar binding machine of the second embodiment, FIG. 18B is a top sectional view of main parts of the reinforcing bar binding machine of the second embodiment, taken along a line O-O of FIG. 18A, and FIG. 18C is a side view of main parts of the binding unit and the drive unit of the reinforcing bar binding machine of the second embodiment, depicting operations during tension applying by twisting of the wire.

Subsequently, the operation of binding the reinforcing bars S with the wire W by the reinforcing bar binding machine 1B of the second embodiment is described with reference to the respective drawings.

The reinforcing bar binding machine 1B is in a standby state where the wire W is sandwiched between the pair of feeding gears 30 and the tip end of the wire W is positioned between the sandwiched position by the feeding gear 30 and the fixed blade part 60 of the cutting unit 6A. Also, when the reinforcing bar binding machine 1A is in the standby state, the first side hook 70L is opened with respect to the center hook 70C and the second side hook 70R is opened with respect to the center hook 70C.

When the reinforcing bars S are inserted between the curl guide 50 and the induction guide 51 of the curl forming unit 5A and the trigger 12A is operated as the reinforcing bars are butted against the butting part 91B, the feeding motor (not shown) is driven in the forward rotation direction, so that the wire W is fed in the forward direction denoted with the arrow F by the wire feeding unit 3A, as shown in FIGS. 12A to 12C.

In a configuration where a plurality of, for example, two wires W are fed, the two wire W are fed aligned in parallel along an axis direction of the loop Ru, which is formed by the wires W, by a wire guide (not shown).

The wire W fed in the forward direction passes between the center hook 70C and the first side hook 70L and is then fed to the curl guide 50 of the curl forming unit 5A. The wire W passes through the curl guide 50, so that it is curled to be wound around the reinforcing bars S.

The wire W curled by the curl guide 50 is guided to the induction guide 51 and is further fed in the forward direction by the wire feeding unit 3A, so that the wire is guided between the center hook 70C and the second side hook 70R by the induction guide 51. The wire W is fed until the tip end is butted against the feeding regulation part 90. When the wire W is fed to a position at which the tip end is butted against the feeding regulation part 90, the drive of the feeding motor (not shown) is stopped.

After the feeding of the wire W in the forward direction is stopped, the motor 80 is driven in the forward rotation direction. In the first operation area where the wire W is engaged by the wire engaging body 70, the rotation regulation blade 74*a* is engaged to the rotation regulation claw 74*b*, so that the rotation of the sleeve 71 in conjunction with the rotation of the rotary shaft 72 is regulated. Thereby, as shown in FIGS. 13A to 13C, the rotation of the motor 80 is converted into linear movement, so that the sleeve 71 is moved in the forward direction denoted with the arrow A1.

When the sleeve 71 is moved in the forward direction, the opening/closing pin 71*a* passes through the opening/closing guide holes 73. Thereby, the first side hook 70L is moved toward the center hook 70C by the rotating operation about the shaft 71*b* as a support point. When the first side hook 70L is closed with respect to the center hook 70C, the wire W sandwiched between the first side hook 70L and the center hook 70C is engaged in such a manner that the wire can move between the first side hook 70L and the center hook 70C.

Also, the second side hook 70R is moved toward the center hook 70C by the rotating operation about the shaft 71*b* as a support point. When the second side hook 70R is closed with respect to the center hook 70C, the wire W sandwiched between the second side hook 70R and the center hook 70C is engaged is in such a manner that the wire cannot come off between the second side hook 70R and the center hook 70C.

After the sleeve 71 is advanced to a position at which the wire W is engaged by the closing operation of the first side hook 70L and the second side hook 70R, the rotation of the motor 80 is temporarily stopped and the feeding motor (not shown) is driven in the reverse rotation direction.

Thereby, as shown in FIGS. 14A to 14C, the pair of feeding gears 30 is reversely rotated and the wire W sandwiched between the pair of feeding gears 30 is fed in the reverse direction denoted with the arrow R. Since the tip end-side of the wire W is engaged in such a manner that the wire cannot come off between the second side hook 70R and the center hook 70C, the wire W is wound on the reinforcing bars S by the operation of feeding the wire W in the reverse direction.

In the operation of winding the wire W on the reinforcing bars S, when the pair of feeding gears 30 is further reversely rotated, since the tip end-side of the wire W is engaged in such a manner that the wire cannot come off between the second side hook 70R and the center hook 70C, the tension applied to the wire W increases.

Thereby, the force of pressing the reinforcing bars S having the wire W wound thereon toward the butting part 91B by the reaction force of the tension applied to the wire W increases. Therefore, as shown in FIGS. 15A to 15C, the butting part 91B intends to move in the backward direction denoted with the arrow A2 together with the second guide plate 94*b*, and the reinforcing bar binding machine 1B moves in the forward direction denoted with the arrow A1 toward the reinforcing bars S, as relative movement. In addition, the tension applying spring 93 is pushed and compressed by the second guide plate 94*b*. Therefore, the reinforcing bars S having the wire W wound thereon are urged forward via the butting part 91B by the tension applying spring 93, and the reinforcing bar binding machine 1B is urged relatively backward.

In the operation of winding the wire W on the reinforcing bars S, as described above, the tension applied to the wire W increases, so that the load applied from the wire W to the pair of feeding gears 30 increases. When the tension applied to the wire W increases, the reinforcing bar binding machine 1B moves in the forward direction denoted with the arrow A1 toward the reinforcing bars S while receiving a force urged by the tension applying spring 93, thereby suppressing a rapid increase in load applied from the wire W to the pair of feeding gears 30. Thereby, the wire W is suppressed from slipping with respect to the pair of feeding gears 30, so that it is possible to apply the stable tension to the wire W when winding the wire.

After the wire W is wound on the reinforcing bars S and the drive of the feeding motor (not shown) in the reverse rotation direction is stopped, the motor 80 is driven in the forward rotation direction, so that the sleeve 71 is further moved in the forward direction denoted with the arrow A1. As shown in FIGS. 16A to 16C, the forward movement of the sleeve 71 is transmitted to the cutting unit 6A by the transmission mechanism 62, so that the movable blade part 61 is rotated and the wire W engaged by the first side hook 70L and the center hook 70C is cut by the operation of the fixed blade part 60 and the movable blade part 61.

When the wire W is cut and the load applied to the movable blade part 61 disappears, the force of pressing the reinforcing bars S to the butting part 91B with the reaction force of the wire W wound on the reinforcing bars S is lowered, so that the force of urging backward the reinforcing bar binding machine 1B by the tension applying spring 93 is weakened.

Thereby, when the wire W is cut, the force of compressing the tension applying spring 93 is weakened and the tension applying spring 93 expands, so that the butting part 91B intends to move forward together with the second guide plate 94*b*, and the reinforcing bar binding machine 1B moves backward away from the reinforcing bars S, as relative movement.

Therefore, when the wire W engaged by the wire engaging body 70 and wound on the reinforcing bars S is cut, a portion of the wire W engaged by the wire engaging body 70 is pulled backward away from the reinforcing bars S, so that the force of pulling backward the wire W engaged by the wire engaging body 70 is suppressed from being lowered. Thereby, the wire W is applied with the tension after the wire W is cut by the cutting unit 6A until the wire W is twisted by the binding unit 7A, so that the wire W wound on the reinforcing bars S by the operation of feeding the wire W in the reverse direction is suppressed from being loosened before twisted.

The bending portions 71*c*1 and 71*c*2 are moved toward the reinforcing bars S substantially at the same time when the sleeve 71 is moved in the forward direction denoted with the arrow A1 to cut the wire W as the motor 80 is driven in the forward rotation direction. Thereby, the tip end-side of the wire W engaged by the center hook 70C and the second side hook 70R is pressed toward the reinforcing bars S and bent toward the reinforcing bars S at the engaging position as a support point by the bending portion 71*c*1. The sleeve 71 is further moved in the forward direction, so that the wire W engaged between the second side hook 70R and the center hook 70C is sandwiched and maintained by the bending portion 71*c*1.

Also, the terminal end-side of the wire W engaged by the center hook 70C and the first side hook 70L and cut by the cutting unit 6A is pressed toward the reinforcing bars S and bent toward the reinforcing bars S at the engaging point as a support point by the bending portion 71*c*2. The sleeve 71 is further moved in the forward direction, so that the wire W engaged between the first side hook 70L and the center hook 70C is sandwiched and maintained by the bending portion 71*c*2.

After the tip end-side and the terminal end-side of the wire W are bent toward the reinforcing bars S, the motor 80 is further driven in the forward rotation direction, so that the sleeve 71 is further moved in the forward direction. When the sleeve 71 is moved to a predetermined position and reaches the operation area where the wire W engaged by the wire engaging body 70 is twisted, the engaging of the rotation regulation blade 74*a* with the rotation regulation claw 74*b* is released.

Thereby, as shown in FIGS. 17A to 17C, the motor 80 is further driven in the forward rotation direction, so that the sleeve 71 rotates in conjunction with the rotary shaft 72, thereby twisting the wire W engaged by the wire engaging body 70.

In the binding unit 7A, in the second operation area where the sleeve 71 rotates to twist the wire W, the wire W engaged by the wire engaging body 70 is twisted, so that a force of pulling forward the wire engaging body 70 in the axis direction of the rotary shaft 72 is applied.

Thereby, the force of pressing the reinforcing bars S on which the wire W to be twisted is wound toward the butting part 91B increases, the butting part 91B intends to move backward together with the second guide plate 94*b*, and the reinforcing bar binding machine 1B moves forward toward the reinforcing bars S, as relative movement. In addition, the tension applying spring 93 is pushed and compressed by the second guide plate 94*b*.

Therefore, the portion of the wire W engaged by the wire engaging body 70 is pulled backward, and the tension is applied in the tangential directions of the reinforcing bars S, so that the wire W is pulled to closely contact the reinforcing bars S. When the wire engaging body 70 further rotates, the reinforcing bar binding machine 1B moves in the forward direction in which a gap between the twisted portion of the wire W and the reinforcing bar S becomes smaller while receiving the force pushed backward by the tension applying spring 93, thereby further twisting the wire W.

Therefore, as shown in FIGS. 18A to 18C, the gap between the twisted portion of the wire W and the reinforcing bars S is reduced and the wire is closely contacted to the reinforcing bar S in a manner of following the reinforcing bar S. Thereby, the loosening before the wire W is twisted is removed, so that it is possible to perform the binding in the state where the wire W is closely contacted to the reinforcing bars S.

When it is detected that a maximum load is applied to the motor 80 as a result of twisting of the wire W, the rotation of the motor 80 in the forward direction is stopped. Then, the motor 80 is driven in the reverse rotation direction, so that the rotary shaft 72 is reversely rotated. When the sleeve 71 is reversely rotated according to the reverse rotation of the rotary shaft 72, the rotation regulation blade 74*a* is engaged to the rotation regulation claw 74*b*, so that the rotation of the sleeve 71 in conjunction with the rotation of the rotary shaft 72 is regulated. Thereby, the sleeve 71 is moved in the backward direction denoted with the arrow A2.

When the sleeve 71 is moved backward, the bending portions 71*c*1 and 71*c*2 separate from the wire W and the engaged state of the wire W by the bending portions 71*c*1 and 71*c*2 is released. Also, when the sleeve 71 is moved backward, the opening/closing pin 71*a* passes through the opening/closing guide holes 73. Thereby, the first side hook 70L is moved away from the center hook 70C by the rotating operation about the shaft 71*b* as a support point. The second side hook 70R is also moved away from the center hook 70C by the rotating operation about the shaft 71*b* as a support point. Thereby, the wire W comes off from the wire engaging body 70.

<Configuration Example of Reinforcing Bar Binding Machine of Third Embodiment>

Figure 19:
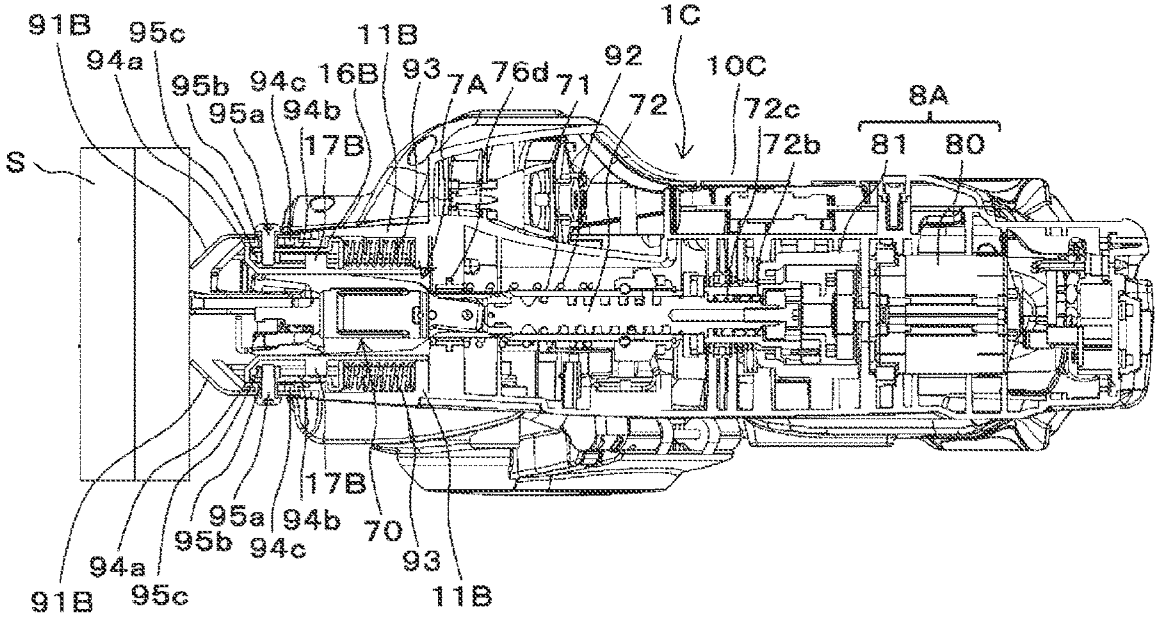
FIG. 19 is a top sectional view of a reinforcing bar binding machine of a third embodiment.

FIG. 19 is a top sectional view of a reinforcing bar binding machine of a third embodiment. The cross section of FIG. 19 is the same as the cross section taken along the line H-H of FIG. 10A. Note that, as for the reinforcing bar binding machine of the third embodiment, the same configurations as the reinforcing bar binding machine of the first and second embodiments are denoted with the same reference signs, and the detailed descriptions thereof are omitted.

A reinforcing bar binding machine 1C of the third embodiment includes a tension applying spring 92 for urging the sleeve 71 in the backward direction denoted with the arrow A2, a butting part 91B against which the reinforcing bars S are butted and which can move in the front and rear direction denoted with the arrows A1 and A2, and a tension applying spring 93 for urging forward the butting part 91B, relatively, urging backward the reinforcing bar binding machine 1C. The tension applying spring 92 is an example of the first tension applying part, and the butting part 91B and the tension applying spring 93 are an example of the second tension applying part.

The connection portion 72*b* for connecting the rotary shaft 72 and the decelerator 81 has a spring 72*c* for urging backward the rotary shaft 72 toward the decelerator 81. Thereby, the rotary shaft 72 is configured to be movable forward away from the decelerator 81 while receiving a force pushed backward by the spring 72*c*.

<Example of Operation of Reinforcing Bar Binding Machine of Third Embodiment>

Figure 20A:
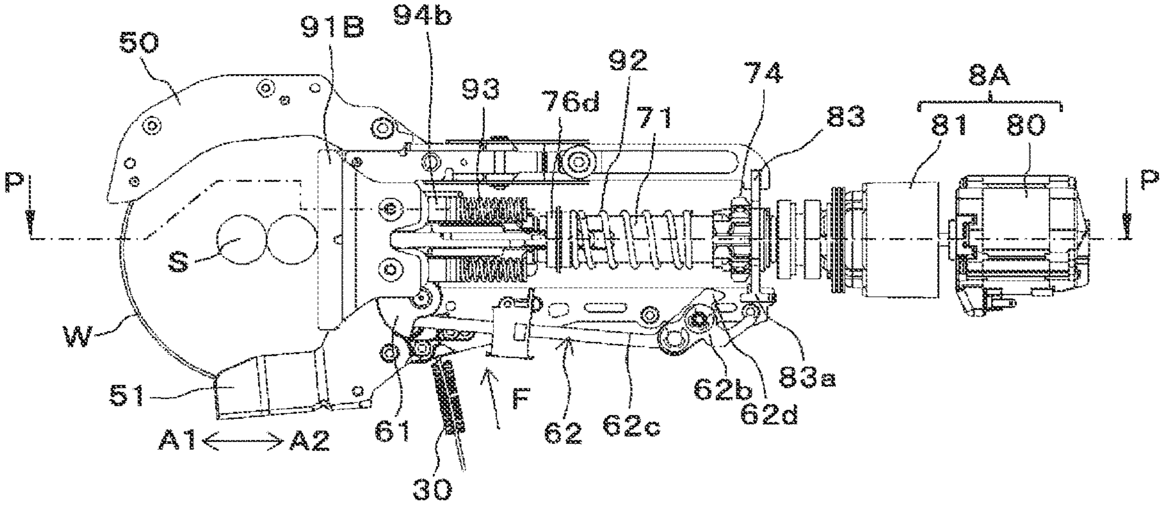
FIG. 20A is a side view of main parts of the reinforcing bar binding machine of the third embodiment.
Figure 20B:
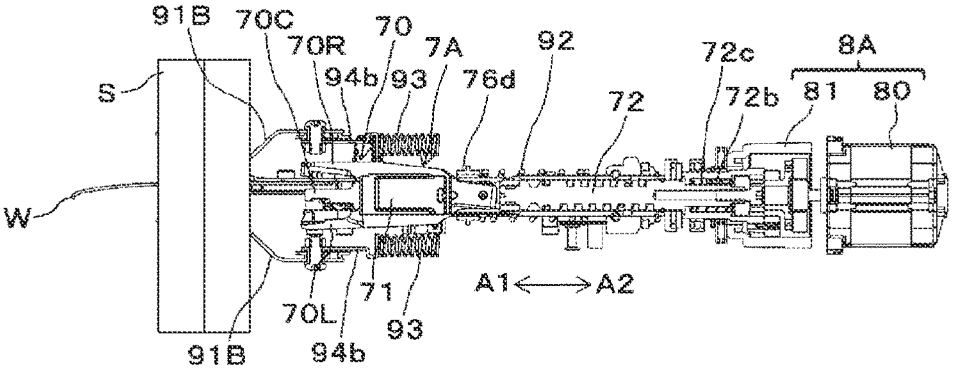
FIG. 20B is a top sectional view of main parts of the reinforcing bar binding machine of the third embodiment.

FIG. 20A is a side view of main parts of the reinforcing bar binding machine of the third embodiment, and FIG. 20B is a top sectional view of main parts of the reinforcing bar binding machine of the third embodiment taken along a line P-P of FIG. 20A, depicting operations during feeding of the wire.

Figure 21A:
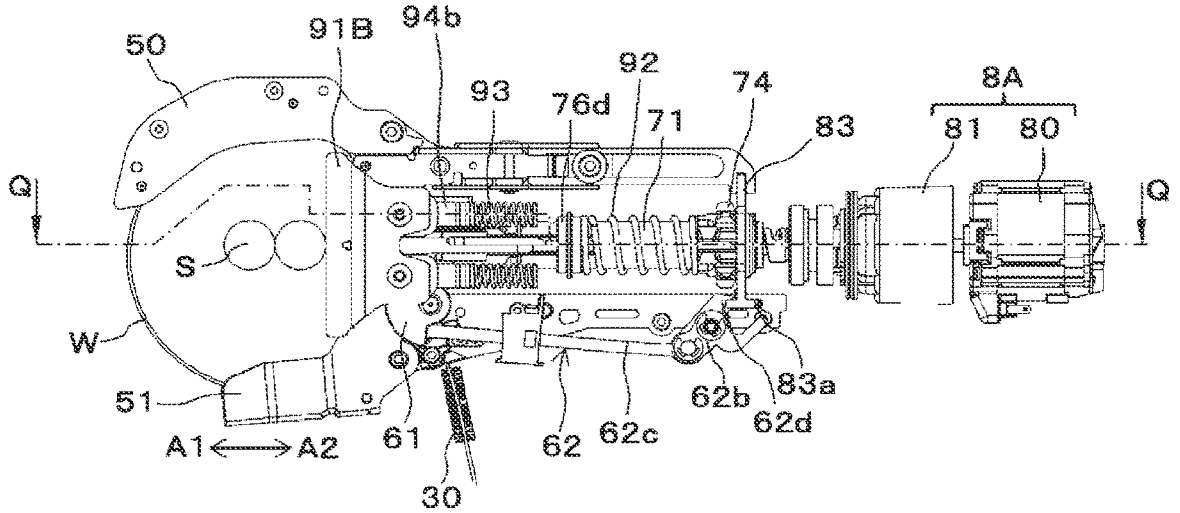
FIG. 21A is a side view of main parts of the reinforcing bar binding machine of the third embodiment.
Figure 21B:
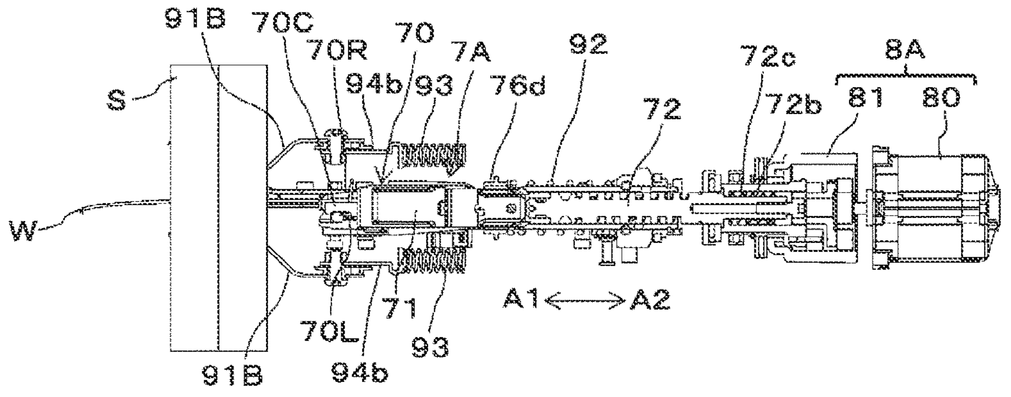
FIG. 21B is atop sectional view of main parts of the reinforcing bar binding machine of the third embodiment.

FIG. 21A is a side view of main parts of the reinforcing bar binding machine of the third embodiment, and FIG. 21B is a top sectional view of main parts of the reinforcing bar binding machine of the third embodiment taken along a line Q-Q of FIG. 21A, depicting operations during engaging of the wire.

Figure 22A:
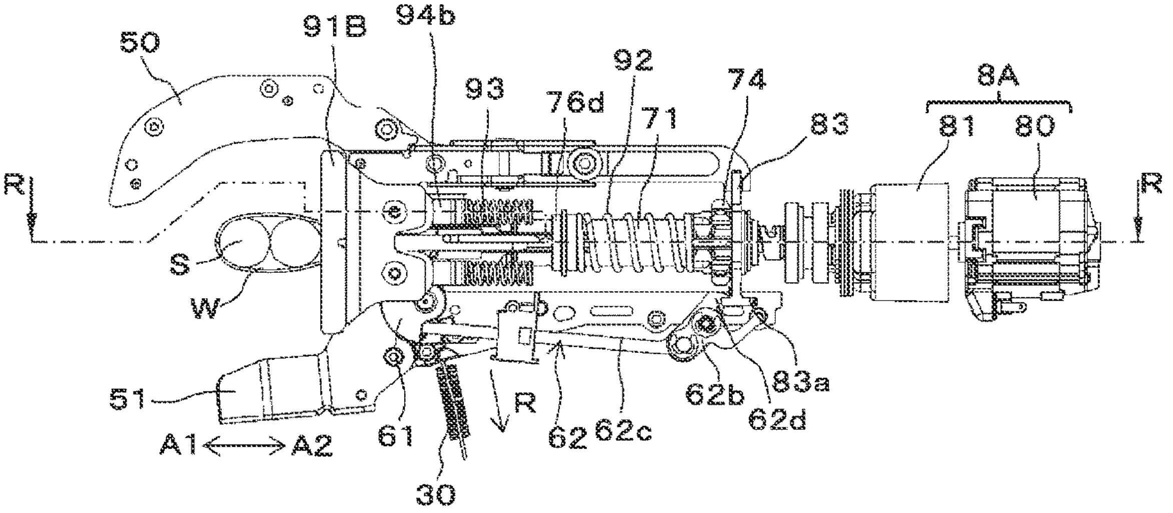
FIG. 22A is a side view of main parts of the reinforcing bar binding machine of the third embodiment.
Figure 22B:
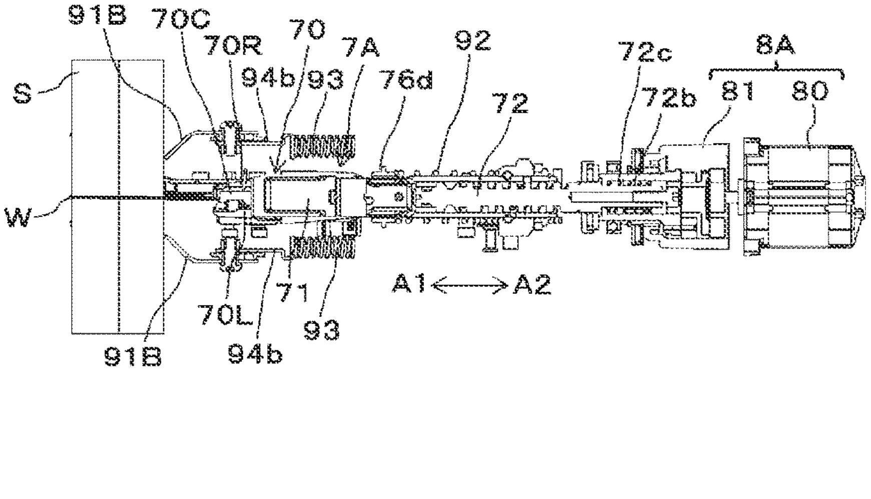
FIG. 22B is a top sectional view of main parts of the reinforcing bar binding machine of the third embodiment.

FIG. 22A is a side view of main parts of the reinforcing bar binding machine of the third embodiment, and FIG. 22B is a top sectional view of main parts of the reinforcing bar binding machine of the third embodiment taken along a line R-R of FIG. 22A, depicting operations during reverse feeding of the wire.

Figure 23A:
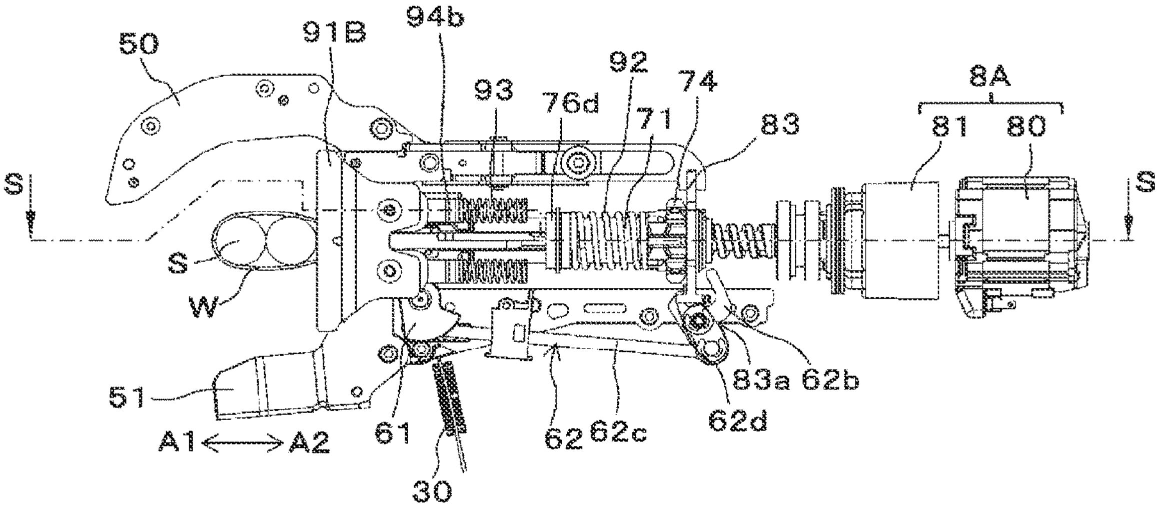
FIG. 23A is a side view of main parts of the reinforcing bar binding machine of the third embodiment.
Figure 23B:
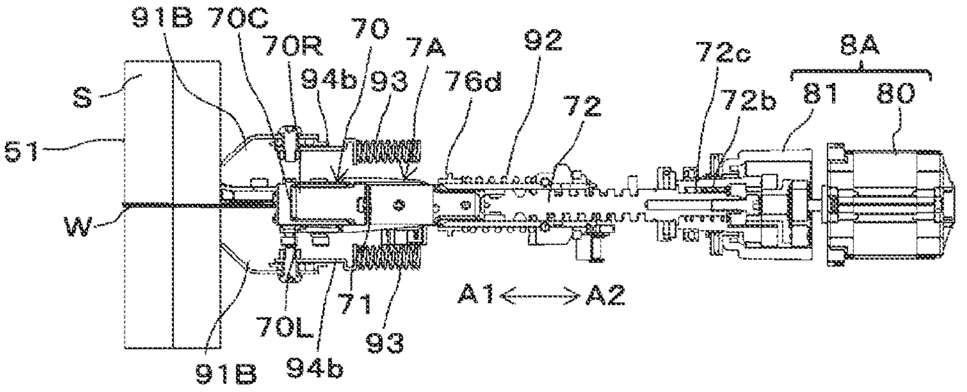
FIG. 23B is a top sectional view of main parts of the reinforcing bar binding machine of the third embodiment.

FIG. 23A is a side view of main parts of the reinforcing bar binding machine of the third embodiment, and FIG. 23B is a top sectional view of main parts of the reinforcing bar binding machine of the third embodiment taken along a line S-S of FIG. 23A, depicting operations during cutting and bending of the wire.

Figure 24A:
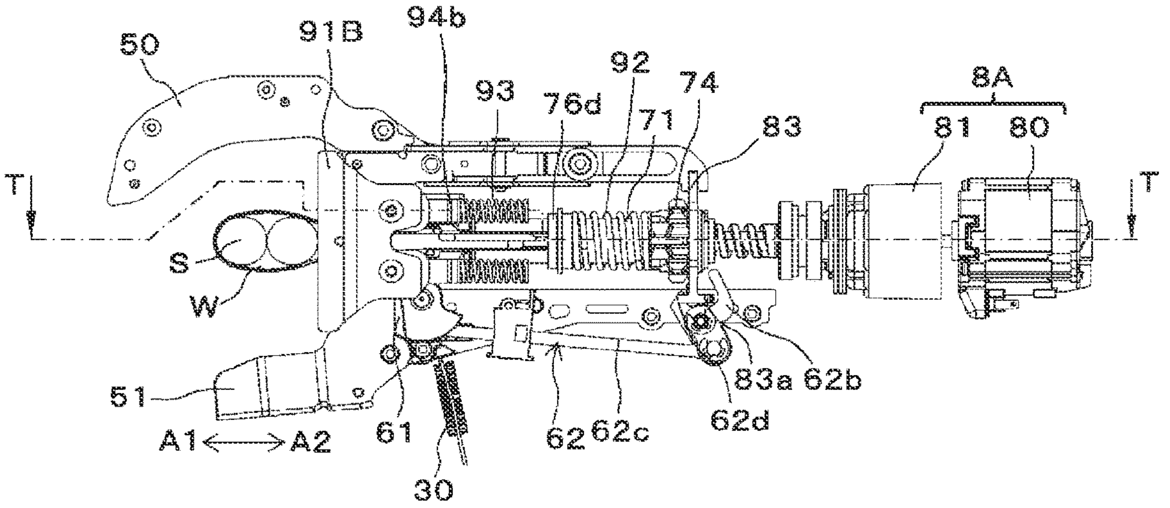
FIG. 24A is a side view of main parts of the reinforcing bar binding machine of the third embodiment.
Figure 24B:
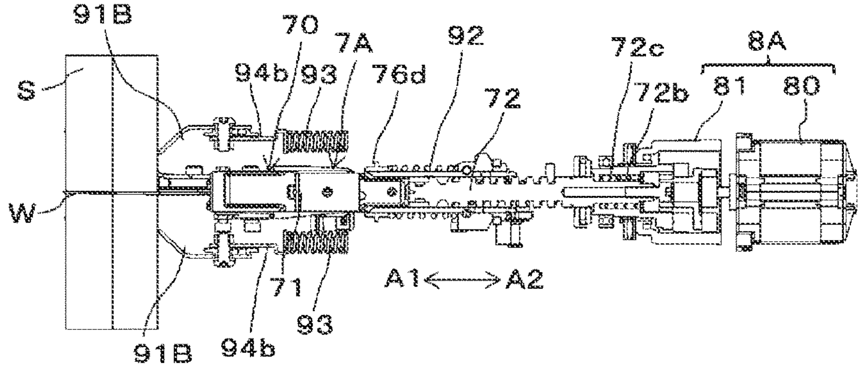
FIG. 24B is a top sectional view of main parts of the reinforcing bar binding machine of the third embodiment.

FIG. 24A is a side view of main parts of the reinforcing bar binding machine of the third embodiment, and FIG. 24B is a top sectional view of main parts of the reinforcing bar binding machine of the third embodiment taken along a line T-T of FIG. 24A, depicting operations twisting of the wire.

Figure 25A:
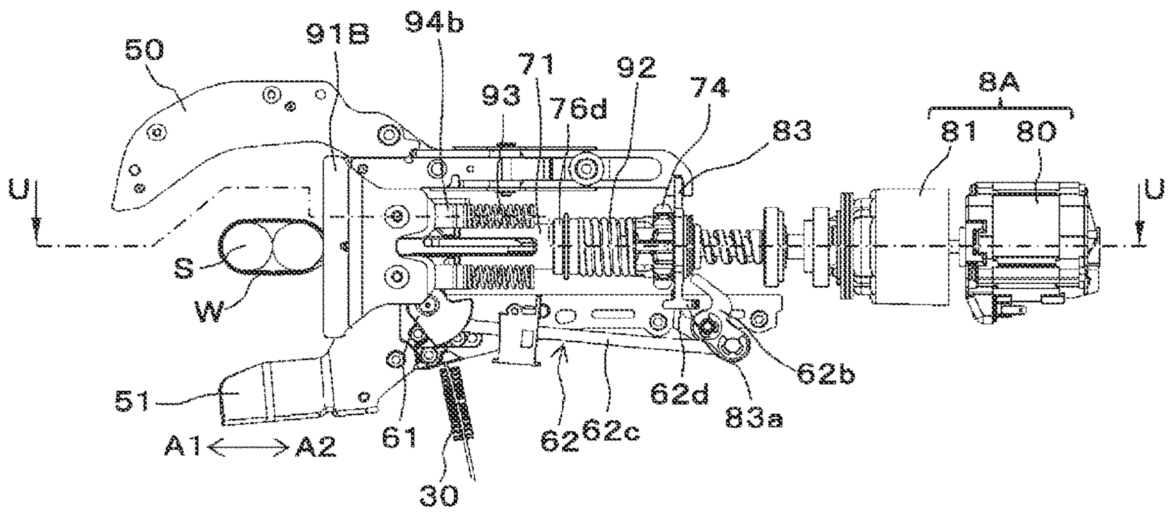
FIG. 25A is a side view of main parts of the reinforcing bar binding machine of the third embodiment.
Figure 25B:
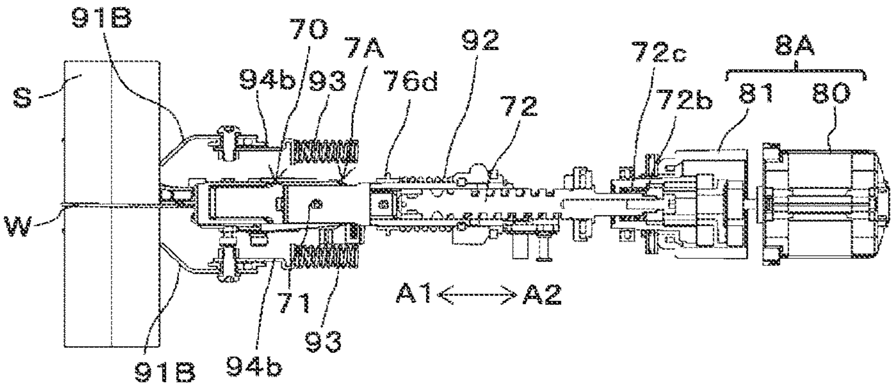
FIG. 25B is a top sectional view of main parts of the reinforcing bar binding machine of the third embodiment.

FIG. 25A is a side view of main parts of the reinforcing bar binding machine of the third embodiment, and FIG. 25B is a top sectional view of main parts of the reinforcing bar binding machine of the third embodiment taken along a line U-U of FIG. 25A, depicting operations during twisting of the wire.

Figure 26A:
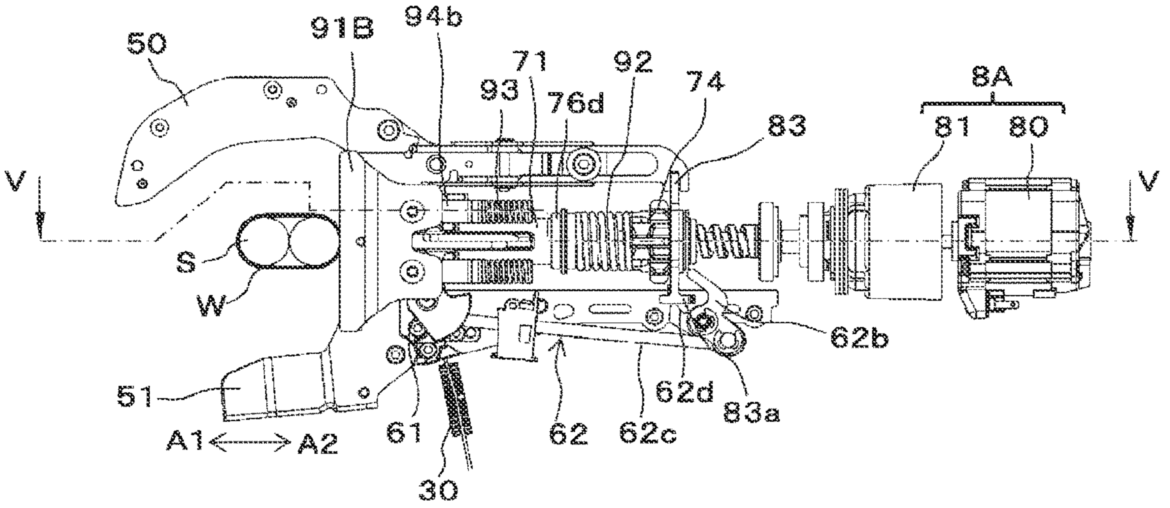
FIG. 26A is a side view of main parts of the reinforcing bar binding machine of the third embodiment.
Figure 26B:
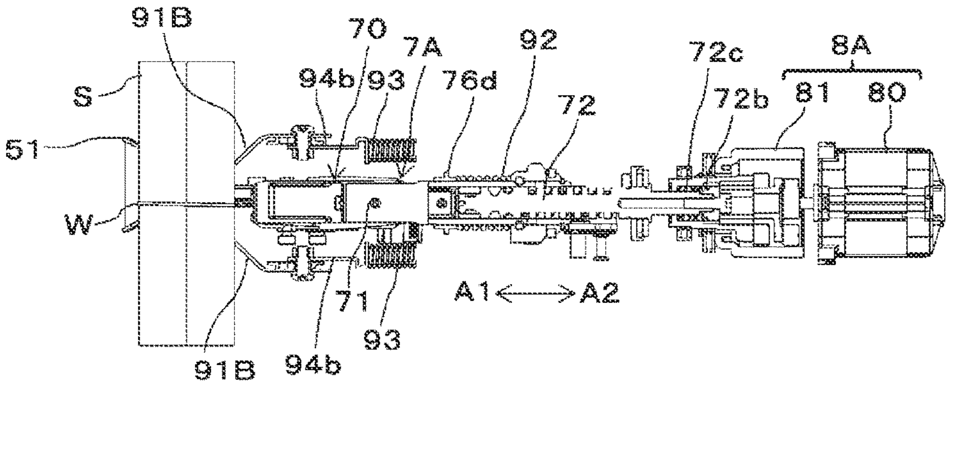
FIG. 26B is a top sectional view of main parts of the reinforcing bar binding machine of the third embodiment.

FIG. 26A is a side view of main parts of the reinforcing bar binding machine of the third embodiment, and FIG. 26B is a top sectional view of main parts of the reinforcing bar binding machine of the third embodiment taken along a line V-V of FIG. 26A, depicting operations during tension applying by twisting of the wire.

Subsequently, the operation of binding the reinforcing bars S with the wire W by the reinforcing bar binding machine 1C of the third embodiment is described with reference to the respective drawings.

The reinforcing bar binding machine 1C is in a standby state where the wire W is sandwiched between the pair of feeding gears 30 and the tip end of the wire W is positioned between the sandwiched position by the feeding gear 30 and the fixed blade part 60 of the cutting unit 6A. Also, when the reinforcing bar binding machine 1C is in the standby state, the sleeve 71 and the wire engaging body 70 the first side hook 70L, the second side hook 70R and the center hook 70C are attached to the sleeve 71 move in the backward direction denoted with the arrow A2, and the first side hook 70L is opened with respect to the center hook 70C and the second side hook 70R is opened with respect to the center hook 70C. Also, when the reinforcing bar binding machine 1C is in the standby state, the rotation regulation blade 74*a* separates from the tension applying spring 92, so that the sleeve 71 and the wire engaging body 70 are not urged backward by the tension applying spring 92.

When the reinforcing bars S are inserted between the curl guide 50 and the induction guide 51A of the curl forming unit 5A and the trigger 12A is operated as the reinforcing bars are butted against the butting part 91B, the feeding motor (not shown) is driven in the forward rotation direction, so that the wire W is fed in the forward direction denoted with the arrow F by the wire feeding unit 3A, as shown in FIGS. 20A and 20B.

In a configuration where a plurality of, for example, two wires W are fed, the two wire W are fed aligned in parallel along an axis direction of the loop Ru, which is formed by the wires W, by a wire guide (not shown).

The wire W fed in the forward direction passes between the center hook 70C and the first side hook 70L and is then fed to the curl guide 50 of the curl forming unit 5A. The wire W passes through the curl guide 50, so that it is curled to be wound around the reinforcing bars S.

The wire W curled by the curl guide 50 is guided to the induction guide 51 and is further fed in the forward direction by the wire feeding unit 3A, so that the wire is guided between the center hook 70C and the second side hook 70R by the induction guide 51. The wire W is fed until the tip end is butted against the feeding regulation part 90. When the wire W is fed to a position at which the tip end is butted against the feeding regulation part 90, the drive of the feeding motor (not shown) is stopped.

After the feeding of the wire W in the forward direction is stopped, the motor 80 is driven in the forward rotation direction. In the first operation area where the wire W is engaged by the wire engaging body 70, the rotation regulation blade 74*a* is engaged to the rotation regulation claw 74*b*, so that the rotation of the sleeve 71 in conjunction with the rotation of the rotary shaft 72 is regulated. Thereby, as shown in FIGS. 21A and 21B, the rotation of the motor 80 is converted into linear movement, so that the sleeve 71 is moved in the forward direction denoted with the arrow A1.

When the sleeve 71 is moved in the forward direction, the opening/closing pin 71*a* passes through the opening/closing guide holes 73. Thereby, the first side hook 70L is moved toward the center hook 70C by the rotating operation about the shaft 71*b* as a support point. When the first side hook 70L is closed with respect to the center hook 70C, the wire W sandwiched between the first side hook 70L and the center hook 70C is engaged in such a manner that the wire can move between the first side hook 70L and the center hook 70C.

Also, the second side hook 70R is moved toward the center hook 70C by the rotating operation about the shaft 71*b* as a support point. When the second side hook 70R is closed with respect to the center hook 70C, the wire W sandwiched between the second side hook 70R and the center hook 70C is engaged is in such a manner that the wire cannot come off between the second side hook 70R and the center hook 70C. In the reinforcing bar binding machine 1C, in the first operation area where the wire W is engaged by the wire engaging body 70, the sleeve 71 and the wire engaging body 70 are not urged backward by the tension applying spring 92, and the load by the tension applying spring 92 is not applied in an operation in which the sleeve 71 and the wire engaging body 70 move in the forward direction denoted with the arrow A1.

After the sleeve 71 is advanced to a position at which the wire W is engaged by the closing operation of the first side hook 70L and the second side hook 70R, the rotation of the motor 80 is temporarily stopped and the feeding motor (not shown) is driven in the reverse rotation direction.

Thereby, as shown in FIGS. 22A and 22B, the pair of feeding gears 30 is reversely rotated, so that the wire W sandwiched between the pair of feeding gears 30 is fed in the reverse direction denoted with the arrow R. Since the tip end-side of the wire W is engaged in such a manner that the wire cannot come off between the second side hook 70R and the center hook 70C, the wire W is wound on the reinforcing bars S by the operation of feeding the wire W in the reverse direction.

After the wire W is wound on the reinforcing bars S and the drive of the feeding motor (not shown) in the reverse rotation direction is stopped, the motor 80 is driven in the forward rotation direction, so that the sleeve 71 is further moved in the forward direction denoted with the arrow A1. As shown in FIGS. 23A and 23B, the forward movement of the sleeve 71 is transmitted to the cutting unit 6A by the transmission mechanism 62, so that the movable blade part 61 is rotated and the wire W engaged by the first side hook 70L and the center hook 70C is cut by the operation of the fixed blade part 60 and the movable blade part 61. In the reinforcing bar binding machine 1C, in the operation area where the sleeve 71 and the wire engaging body 70 are moved forward to cut the wire W, the rotation regulation blade 74*a* is contacted to the tension applying spring 92 and the tension applying spring 92 is compressed between the support frame 76*d* and the rotation regulation blade 74*a*, so that the sleeve 71 and the wire engaging body 70 are urged backward by the tension applying spring 92.

When the wire W is cut, the load applied to the movable blade part 61 disappears. As described above, in the configuration where the binding unit 7A and the cutting unit 6A operate in conjunction with each other, when the load applied to the movable blade part 61 disappears, the force with which the movement of the sleeve 71 is regulated by the load applied to the movable blade part 61 is lowered.

In contrast, according to the present embodiment, the sleeve 71 is urged backward by the tension applying spring 92 compressed between the support frame 76*d* and the rotation regulation blade 74*a* by the forward movement of the sleeve 71. The compressed tension applying spring 92 is extended, so that the force of urging backward the sleeve 71 is stronger than the reaction force of the tension applied to the wire W as a result of the wire W being wound on the reinforcing bars S. For this reason, even when the wire W is cut, the load applied to the movable blade part 61 disappears and the force of regulating the movement of the sleeve 71 by the load applied to the movable blade part 61 is lowered, the forward movement of the sleeve 71 is suppressed.

The forward movement of the sleeve 71 is suppressed, so that the force of pulling backward the wire W engaged by the wire engaging body 70 is suppressed from being lowered. Thereby, the wire W wound on the reinforcing bars S by the operation of feeding the wire W in the reverse direction is suppressed from being loosened before the wire is twisted. Note that, the spring 72*c* may be configured as the tension applying part by setting the force of urging backward the rotary shaft 72, which is connected to the decelerator 81 to be axially movable, by the spring 72*c* stronger than the reaction force of the tension that is applied to the wire W as the wire is wound on the reinforcing bars S.

The bending portions 71*c*1 and 71*c*2 are moved toward the reinforcing bars S substantially at the same time when the sleeve 71 is moved in the forward direction denoted with the arrow A1 to cut the wire W as the motor 80 is driven in the forward rotation direction. Thereby, the tip end-side of the wire W engaged by the center hook 70C and the second side hook 70R is pressed toward the reinforcing bars S and bent toward the reinforcing bars S at the engaging position as a support point by the bending portion 71*c*1. The sleeve 71 is further moved in the forward direction, so that the wire W engaged between the second side hook 70R and the center hook 70C is sandwiched and maintained by the bending portion 71*c*1.

Also, the terminal end-side of the wire W engaged by the center hook 70C and the first side hook 70L and cut by the cutting unit 6A is pressed toward the reinforcing bars S and bent toward the reinforcing bars S at the engaging point as a support point by the bending portion 71*c*2. The sleeve 71 is further moved in the forward direction, so that the wire W engaged between the first side hook 70L and the center hook 70C is sandwiched and maintained by the bending portion 71*c*2.

After the tip end-side and the terminal end-side of the wire W are bent toward the reinforcing bars S, the motor 80 is further driven in the forward rotation direction, so that the sleeve 71 is further moved in the forward direction. When the sleeve 71 is moved to a predetermined position and reaches the operation area where the wire W engaged by the wire engaging body 70 is twisted, the engaging of the rotation regulation blade 74*a* with the rotation regulation claw 74*b* is released.

Thereby, as shown in FIGS. 24A and 24B, the motor 80 is further driven in the forward rotation direction, so that the sleeve 71 rotates in conjunction with the rotary shaft 72, thereby twisting the wire W engaged by the wire engaging body 70.

In the binding unit 7A, in the second operation area where the sleeve 71 rotates to twist the wire W, the wire W engaged by the wire engaging body 70 is twisted, so that a force of pulling forward the wire engaging body 70 in the axis direction of the rotary shaft 72 is applied. In the meantime, the sleeve 71 is moved forward up to a position at which it can rotate, so that the tension applying spring 92 is further compressed and the sleeve 71 receives the force pushed backward by the tension applying spring 92.

Thereby, when a force for moving forward in the axis direction is applied to the wire engaging body 70, the wire engaging body 70 and the rotary shaft 72 are moved forward while the sleeve 71 receives the force pushed backward by the tension applying spring 92 and the rotary shaft 72 receives the force pushed backward by the spring 72*c*, thereby twisting the wire W while moving forward, as shown in FIGS. 25A, 25B and 8C.

Therefore, the portion of the wire W engaged by the wire engaging body 70 is pulled backward, and the tension is applied in the tangential directions of the reinforcing bars S, so that the wire W is pulled to closely contact the reinforcing bars S. In the binding unit 7A, in the second operation area where the sleeve 71 rotates to twist the wire W, when the wire engaging body 70 further rotates in conjunction with the rotary shaft 72, the wire engaging body 70 and the rotary shaft 72 move in the forward direction in which a gap between the twisted portion of the wire W and the reinforcing bar S becomes smaller, thereby further twisting the wire W.

In the second operation area where the wire W is twisted, the urging forces of the tension applying spring 92 and the spring 72*c* and the like are set so that the tension applied to the wire W as the portion engaged by the wire engaging body 70 is pulled backward is equal to or larger than 10% and equal to or smaller than 50% with respect to the maximum tensile load of the wire W. When the tension applied to the wire W is equal to or larger than 10% and equal to or smaller than 50% with respect to the maximum tensile load of the wire W, the loosening due to an extra part of the wire can be removed, the wire W can be closely contacted to the reinforcing bars S, and the wire W can be prevented from being carelessly cut. In addition, it is possible to suppress the unnecessarily high outputs of the motor 80 and the feeding motor (not shown). Therefore, it is possible to suppress increases in the size of the motor and the size of the entire device so as to make the device sturdy, which leads to improvement on a handling property as a product.

In the meantime, the force of pressing the reinforcing bars S on which the wire W to be twisted is wound toward the butting part 91B increases, the butting part 91B intends to move backward together with the second guide plate 94*b*, and the reinforcing bar binding machine 1B move in the forward direction in which a gap between the twisted portion of the wire W and the reinforcing bar S becomes smaller, as relative movement, thereby further twisting the wire W, while receiving a force pushed backward by the tension applying spring 93.

Therefore, as shown in FIGS. 26A, 26B and 9C, the wire W is twisted as the wire engaging body 70 and the rotary shaft 72 are moved forward with receiving the forces pushed backward by the tension applying spring 92 and the spring 72*c*. Also, the wire W is twisted as the reinforcing bar binding machine 1B is moved forward with receiving the force pushed backward by the tension applying spring 93. Therefore, the gap between the twisted portion of the wire W and the reinforcing bars S is reduced and the wire is closely contacted to the reinforcing bar S in a manner of following the reinforcing bar S. Thereby, the loosening before the wire W is twisted is removed, so that it is possible to perform the binding in the state where the wire W is closely contacted to the reinforcing bars S.

When it is detected that a maximum load is applied to the motor 80 as a result of twisting of the wire W, the rotation of the motor 80 in the forward direction is stopped. Then, the motor 80 is driven in the reverse rotation direction, so that the rotary shaft 72 is reversely rotated. When the sleeve 71 is reversely rotated according to the reverse rotation of the rotary shaft 72, the rotation regulation blade 74*a* is engaged to the rotation regulation claw 74*b*, so that the rotation of the sleeve 71 in conjunction with the rotation of the rotary shaft 72 is regulated. Thereby, the sleeve 71 is moved in the backward direction denoted with the arrow A2.

When the sleeve 71 is moved backward, the bending portions 71*c*1 and 71*c*2 separate from the wire W and the engaged state of the wire W by the bending portions 71*c*1 and 71*c*2 is released. Also, when the sleeve 71 is moved backward, the opening/closing pin 71*a* passes through the opening/closing guide holes 73. Thereby, the first side hook 70L is moved away from the center hook 70C by the rotating operation about the shaft 71*b* as a support point. The second side hook 70R is also moved away from the center hook 70C by the rotating operation about the shaft 71*b* as a support point. Thereby, the wire W comes off from the wire engaging body 70.

What is claimed is:

1. A binding machine comprising:
- a wire feeding unit configured to feed a wire;
- a curl forming unit configured to form a path along which the wire fed by the wire feeding unit is to be wound around a to-be-bound object;
- a butting part against which the to-be-bound object is to be butted;
- a cutting unit configured to cut the wire wound on the to-be-bound object;
- a binding unit configured to twist the wire wound on the to-be-bound object and cut by the cutting unit, the binding unit comprising:
  - a rotary shaft,
  - a wire engaging body configured to move in an axis direction of the rotary shaft, to engage the wire and to twist the wire with rotating together with the rotary shaft, and
  - a spring for urging the rotary shaft in a direction in which the wire engaging body gets away from the butting part along the axis direction of the rotary shaft, and for regulating an axial position of the rotary shaft; and
- a tension applying part, separate from the spring, configured to apply tension to the wire to be cut at the cutting unit with a force higher than a reaction force of the wire in a loosening direction of the wire wound on the to-be-bound object.

2. The binding machine according to claim 1, wherein the tension applying part is configured to maintain the tension applied to the wire by an operation of reversely feeding the wire and winding the wire on the to-be-bound object.

3. The binding machine according to claim 1, wherein the tension applying part is configured to urge at least one of the wire engaging body and the rotary shaft in a direction in which the tension applying part maintains the tension applied to the wire by an operation of reversely feeding the wire and winding the wire on the to-be-bound object.

4. The binding machine according to claim 3, wherein in an operation area where the wire engaging body moves in the axis direction of the rotary shaft and twists the wire with rotating together with the rotary shaft, the tension applied to the wire by the tension applying part is equal to or larger than 10% and equal to or smaller than 50% with respect to a maximum tensile load of the wire.

5. The binding machine according to claim 3, wherein the tension applying part includes a tension applying spring configured to urge the wire engaging body in a direction away from the butting part along the axis direction of the rotary shaft.

6. The binding machine according to claim 5, wherein the wire engaging body comprises a hook configured to engage the wire by an opening/closing operation and a sleeve configured to open/close the hook, and wherein the tension applying part is a coil spring and is provided on an outer side of the sleeve.

7. The binding machine according to claim 1, wherein the tension applying part is configured to apply the tension to the wire after cutting the wire by the cutting unit until twisting the wire by the binding unit.

8. The binding machine according to claim 1, wherein the tension applying part is configured to urge the to-be-bound object butted against the butting part and the binding unit engaging the wire in a direction getting away from each other.

9. The binding machine according to claim 1, wherein the tension applying part comprises: a first tension applying part configured to urge at least one of the wire engaging body and the rotary shaft in a direction which maintains the tension applied to the wire by an operation of reversely feeding the wire and winding the wire on the to-be-bound object, and a second tension applying part configured to urge the to-be-bound object butted against the butting part and the binding unit engaging the wire in a direction getting away from each other.

* * * * *